United States Patent
Zani et al.

(10) Patent No.: US 12,493,005 B1
(45) Date of Patent: Dec. 9, 2025

(54) EXTENDED RANGE ACTIVE ILLUMINATION IMAGER

(71) Applicant: NexGen Semi Holding, Inc., Laguna Niguel, CA (US)

(72) Inventors: Michael John Zani, Laguna Niguel, CA (US); Mark Joseph Bennahmias, Wesley Chapel, FL (US)

(73) Assignee: NexGen Semi Holding, Inc., Laguna Niguel, CA (US)

( * ) Notice: Subject to any disclaimer, the term of this patent is extended or adjusted under 35 U.S.C. 154(b) by 341 days.

(21) Appl. No.: 18/328,114

(22) Filed: Jun. 2, 2023

Related U.S. Application Data

(60) Provisional application No. 63/365,985, filed on Jun. 7, 2022.

(51) Int. Cl.
  *G01N 23/22* (2018.01)
  *G01N 23/225* (2018.01)

(52) U.S. Cl.
  CPC ... *G01N 23/225* (2013.01); *G01N 2223/3301* (2013.01)

(58) Field of Classification Search
  CPC ............. G01N 23/225; G01N 2223/3301
  See application file for complete search history.

(56) References Cited

U.S. PATENT DOCUMENTS

| | | | |
|---|---|---|---|
| 2,606,291 | A | 8/1952 | Wilson |
| 3,317,846 | A | 5/1967 | Dryden |
| 3,375,396 | A | 3/1968 | Haimson et al. |
| 3,403,346 | A | 9/1968 | Giordano |
| 3,710,163 | A | 1/1973 | Bomko et al. |
| 3,789,185 | A | 1/1974 | Baldwin et al. |
| 3,798,447 | A | 3/1974 | Lanusse et al. |
| 3,845,305 | A | 10/1974 | Liebl |
| 3,900,737 | A | 8/1975 | Collier et al. |
| 3,906,300 | A | 9/1975 | Tran |
| 3,924,113 | A | 12/1975 | Gill et al. |
| 4,066,893 | A | 1/1978 | Dawson |
| 4,093,891 | A | 6/1978 | Christie et al. |

(Continued)

FOREIGN PATENT DOCUMENTS

| | | |
|---|---|---|
| EP | 0896201 | 2/1999 |
| WO | WO 1989/012805 | 12/1989 |

(Continued)

OTHER PUBLICATIONS

Ada et al., "Ion beam modification and patterning of organosilane self-assembled monolayers," J. Vac. Sci. Technol. B 13 (6), Nov./Dec. 1995, pp. 2189-2196.

(Continued)

*Primary Examiner* — Nicole M Ippolito
(74) *Attorney, Agent, or Firm* — Knobbe, Martens, Olson & Bear, LLP

(57) ABSTRACT

A particle beam illuminating system includes a beam steering control subsystem configured to receive charged particles and to generate and scan a particle beam over at least a portion of a target located a distance of at least 10 meters from the beam steering control subsystem. The system further includes a beam charge control subsystem configured to receive the particle beam from the beam steering control subsystem and to control an output charge of the particle beam impinging the target.

90 Claims, 6 Drawing Sheets

(56) References Cited

U.S. PATENT DOCUMENTS

| | | |
|---|---|---|
| 4,124,802 A | 11/1978 | Terasawa et al. |
| 4,132,892 A | 1/1979 | Wittmaack |
| 4,153,843 A | 5/1979 | Pease |
| 4,211,954 A | 7/1980 | Swenson |
| 4,255,661 A | 3/1981 | Liebl |
| 4,323,638 A | 4/1982 | Adams et al. |
| 4,327,292 A | 4/1982 | Wang et al. |
| 4,383,180 A | 5/1983 | Turner |
| 4,418,283 A | 11/1983 | Trotel |
| 4,430,571 A | 2/1984 | Smith et al. |
| 4,431,923 A | 2/1984 | Wang et al. |
| 4,433,384 A | 2/1984 | Berrian et al. |
| 4,445,039 A | 4/1984 | Yew |
| 4,467,240 A | 8/1984 | Futamoto et al. |
| 4,469,950 A | 9/1984 | Taylor et al. |
| 4,477,729 A | 10/1984 | Chang et al. |
| 4,482,802 A | 11/1984 | Aizawa et al. |
| 4,494,004 A | 1/1985 | Mauer, IV et al. |
| 4,498,010 A | 2/1985 | Biechler et al. |
| 4,511,980 A | 4/1985 | Watanabe et al. |
| 4,525,629 A | 6/1985 | Morita et al. |
| 4,556,794 A | 12/1985 | Ward et al. |
| 4,556,798 A | 12/1985 | McKenna et al. |
| 4,563,587 A | 1/1986 | Ward et al. |
| 4,667,111 A | 5/1987 | Glavish et al. |
| 4,687,940 A | 8/1987 | Ward et al. |
| 4,698,509 A | 10/1987 | Wells et al. |
| 4,710,632 A | 12/1987 | Ishitani et al. |
| 4,716,127 A | 12/1987 | Shukuri et al. |
| 4,746,839 A | 5/1988 | Kazusa et al. |
| 4,757,208 A | 7/1988 | McKenna et al. |
| 4,774,414 A | 9/1988 | Umemura et al. |
| 4,789,787 A | 12/1988 | Parker |
| 4,804,837 A | 2/1989 | Farley |
| 4,806,921 A | 2/1989 | Goodman et al. |
| 4,816,692 A | 3/1989 | Rudert |
| 4,818,872 A | 4/1989 | Parker |
| 4,818,885 A | 4/1989 | Davis et al. |
| 4,837,447 A | 6/1989 | Pierce et al. |
| 4,853,870 A | 8/1989 | Yasutake et al. |
| 4,874,460 A | 10/1989 | Nakagawa et al. |
| 4,879,605 A | 11/1989 | Warkentin et al. |
| 4,885,472 A | 12/1989 | Young |
| 4,893,163 A | 1/1990 | Rudeck |
| 4,900,414 A | 2/1990 | Sibalis |
| 4,908,226 A | 3/1990 | Kubena et al. |
| 4,929,839 A | 5/1990 | Parker et al. |
| 4,936,968 A | 6/1990 | Ohnishi et al. |
| 4,957,771 A | 9/1990 | Enloe |
| 4,967,380 A | 10/1990 | Szajnowski et al. |
| 5,103,101 A | 4/1992 | Berlund et al. |
| 5,113,141 A | 5/1992 | Swenson |
| 5,136,171 A | 8/1992 | Leung et al. |
| 5,149,976 A | 9/1992 | Sipma |
| 5,155,368 A | 10/1992 | Edwards et al. |
| 5,155,715 A | 10/1992 | Ueyema et al. |
| 5,187,371 A | 2/1993 | Matsui et al. |
| 5,206,506 A | 4/1993 | Kirchner |
| 5,223,109 A | 6/1993 | Itoh et al. |
| 5,241,182 A | 8/1993 | Martin et al. |
| 5,244,820 A | 9/1993 | Kamata et al. |
| 5,267,471 A | 12/1993 | Abraham et al. |
| 5,301,124 A | 4/1994 | Langner et al. |
| 5,306,601 A | 4/1994 | Hashimoto et al. |
| 5,329,130 A | 7/1994 | Kai et al. |
| 5,331,172 A | 7/1994 | Kumar et al. |
| 5,393,987 A | 2/1995 | Abboud et al. |
| 5,401,973 A | 3/1995 | McKeown et al. |
| 5,407,976 A | 4/1995 | Uhlianuk |
| 5,447,614 A | 9/1995 | Hamamura et al. |
| 5,482,802 A | 1/1996 | Celler et al. |
| 5,580,419 A | 12/1996 | Berenz |
| 5,598,002 A | 1/1997 | Todokoro et al. |
| 5,621,216 A | 4/1997 | Clarke et al. |
| 5,650,751 A | 7/1997 | Symons |
| 5,654,127 A | 8/1997 | Leedy |
| 5,683,595 A | 11/1997 | Nagamachi |
| 5,719,478 A | 2/1998 | Washio et al. |
| 5,725,995 A | 3/1998 | Leedy |
| 5,814,940 A | 9/1998 | Fujisawa |
| 5,825,140 A | 10/1998 | Fujisawa |
| 5,827,786 A | 10/1998 | Puretz |
| 5,834,786 A | 11/1998 | White et al. |
| 5,844,416 A | 12/1998 | Campbell et al. |
| 5,869,751 A | 2/1999 | Bonin |
| 5,892,231 A | 4/1999 | Baylor et al. |
| 5,904,552 A | 5/1999 | Shiralagi et al. |
| 6,028,662 A | 2/2000 | Sturans et al. |
| 6,107,108 A | 8/2000 | Chen et al. |
| 6,137,112 A | 10/2000 | McIntyre et al. |
| 6,145,438 A | 11/2000 | Berglund et al. |
| 6,242,751 B1 | 6/2001 | Takemoto et al. |
| 6,274,290 B1 | 8/2001 | Veneklasen et al. |
| 6,344,116 B2 | 2/2002 | Warner, Jr. et al. |
| 6,410,924 B1 | 6/2002 | Wang |
| 6,423,976 B1 | 7/2002 | Glavish et al. |
| 6,462,347 B1 | 10/2002 | Oh |
| 6,492,261 B2 | 12/2002 | Gavish et al. |
| 6,573,014 B2 | 6/2003 | Yamaguchi et al. |
| 6,583,411 B1 | 6/2003 | Altmann et al. |
| 6,583,426 B1 | 6/2003 | Kawanami et al. |
| 6,605,816 B2 | 8/2003 | Sandstrom |
| 6,635,890 B2 | 10/2003 | Saadatmand et al. |
| 6,678,125 B2 | 1/2004 | Platzgummer et al. |
| 6,710,557 B1 | 3/2004 | Allen et al. |
| 6,753,538 B2 | 6/2004 | Musil et al. |
| 6,759,665 B2 | 7/2004 | Benveniste et al. |
| 6,768,120 B2 | 7/2004 | Leung et al. |
| 6,768,125 B2 | 7/2004 | Platzgummer et al. |
| 6,791,078 B2 | 9/2004 | Giles et al. |
| 6,812,453 B2 | 11/2004 | Bateman |
| 6,818,910 B2 | 11/2004 | Stanton et al. |
| 6,825,101 B1 | 11/2004 | Hawryluk et al. |
| 6,835,289 B2 | 12/2004 | Yamashita |
| 6,875,700 B2 | 4/2005 | Kanakasabapathy et al. |
| 6,888,146 B1 | 5/2005 | Leung et al. |
| 6,924,493 B1 | 8/2005 | Leung |
| 6,996,450 B2 | 2/2006 | Suttile et al. |
| 6,998,217 B2 | 2/2006 | Martyniuk et al. |
| 7,005,044 B2 | 2/2006 | Kramer et al. |
| 7,014,735 B2 | 3/2006 | Kramer et al. |
| 7,045,430 B2 | 5/2006 | Ahn et al. |
| 7,053,981 B2 | 5/2006 | Bleeker |
| 7,071,467 B2 | 7/2006 | Bateman et al. |
| 7,091,134 B1 | 8/2006 | Meinhold et al. |
| 7,098,614 B2 | 8/2006 | Yamashita |
| 7,129,502 B2 | 10/2006 | Kruit |
| 7,202,488 B2 | 4/2007 | Ota et al. |
| 7,202,691 B2 | 4/2007 | Lagowski et al. |
| 7,242,012 B2 | 7/2007 | Leedy |
| 7,259,272 B2 | 8/2007 | Zani et al. |
| 7,259,373 B2 | 8/2007 | Zani et al. |
| 7,309,863 B2 | 12/2007 | Kawakatsu |
| 7,329,882 B2 | 2/2008 | Rathmell et al. |
| 7,368,729 B2 | 5/2008 | Shichi et al. |
| 7,485,244 B2 | 2/2009 | Nakamura et al. |
| 7,488,960 B2 | 2/2009 | Zani et al. |
| 7,495,242 B2 | 2/2009 | Zani et al. |
| 7,495,244 B2 | 2/2009 | Zani et al. |
| 7,495,245 B2 | 2/2009 | Zani et al. |
| 7,501,644 B2 | 3/2009 | Zani et al. |
| 7,507,960 B2 | 3/2009 | Zani et al. |
| 7,659,526 B2 | 2/2010 | Zani et al. |
| 7,755,066 B2 | 7/2010 | Evans |
| 7,993,813 B2 | 8/2011 | Scott et al. |
| 8,278,027 B2 | 10/2012 | Scott et al. |
| 8,409,984 B2 | 4/2013 | Bennahmias et al. |
| 8,658,994 B2 | 2/2014 | Zani et al. |
| 10,566,169 B1 | 2/2020 | Bennahmias et al. |
| 10,991,545 B2 | 4/2021 | Bennahmias et al. |
| 11,335,537 B2 | 5/2022 | Bennahmias et al. |
| 2001/0032929 A1 | 10/2001 | Fuhrer et al. |
| 2002/0063210 A1 | 5/2002 | Bateman et al. |
| 2002/0094694 A1 | 7/2002 | Phillip et al. |

(56) References Cited

U.S. PATENT DOCUMENTS

| | | | |
|---|---|---|---|
| 2002/0148959 A1 | 10/2002 | Weiss et al. | |
| 2002/0175278 A1 | 11/2002 | Whitehouse | |
| 2003/0001084 A1 | 1/2003 | Bateman et al. | |
| 2003/0001085 A1 | 1/2003 | Bateman et al. | |
| 2003/0001088 A1 | 1/2003 | Bateman et al. | |
| 2003/0038254 A1 | 2/2003 | Kourosh et al. | |
| 2003/0102444 A1 | 6/2003 | Deppert et al. | |
| 2003/0168608 A1 | 9/2003 | Ji et al. | |
| 2003/0205679 A1 | 11/2003 | Benveniste | |
| 2003/0233870 A1 | 12/2003 | Mancevski | |
| 2004/0020434 A1 | 2/2004 | Gavish et al. | |
| 2004/0031916 A1 | 2/2004 | Bateman et al. | |
| 2004/0036040 A1 | 2/2004 | Stanton et al. | |
| 2004/0046585 A1 | 3/2004 | Kamieniecki et al. | |
| 2004/0051053 A1 | 3/2004 | Barletta et al. | |
| 2004/0065842 A1 | 4/2004 | Parr et al. | |
| 2004/0094709 A1 | 5/2004 | Bateman | |
| 2004/0124354 A1 | 7/2004 | Bateman et al. | |
| 2004/0146133 A1 | 7/2004 | Leung | |
| 2004/0150068 A1 | 8/2004 | Leedy | |
| 2004/0178170 A1 | 9/2004 | Morimoto | |
| 2004/0212331 A1 | 10/2004 | Swenson et al. | |
| 2004/0232327 A1 | 11/2004 | Bateman et al. | |
| 2005/0076484 A1 | 4/2005 | Sussenbach et al. | |
| 2005/0231138 A1 | 10/2005 | Nakanishi et al. | |
| 2005/0242299 A1 | 11/2005 | Elmer et al. | |
| 2005/0271813 A1 | 12/2005 | Kher et al. | |
| 2006/0008707 A1 | 1/2006 | Watanabe et al. | |
| 2006/0043312 A1 | 3/2006 | Siebert et al. | |
| 2006/0046522 A1 | 3/2006 | Ahn et al. | |
| 2006/0076484 A1 | 4/2006 | Brown et al. | |
| 2006/0160431 A1 | 7/2006 | Herbst et al. | |
| 2006/0163496 A1 | 7/2006 | Hiramoto et al. | |
| 2006/0163498 A1 | 7/2006 | Yoneda et al. | |
| 2006/0169924 A1 | 8/2006 | Purser | |
| 2006/0202644 A1 | 9/2006 | Brown et al. | |
| 2006/0228634 A1 | 10/2006 | Bret et al. | |
| 2007/0001128 A1 | 1/2007 | Sliski et al. | |
| 2007/0035260 A1 | 2/2007 | Ho et al. | |
| 2007/0045534 A1 | 3/2007 | Zani | |
| 2007/0050446 A1 | 3/2007 | Moore | |
| 2007/0085032 A1 | 4/2007 | Buller et al. | |
| 2007/0098892 A1 | 5/2007 | Chung et al. | |
| 2008/0061233 A1 | 3/2008 | Ogawa | |
| 2008/0160431 A1 | 7/2008 | Scott et al. | |
| 2008/0191151 A1 | 8/2008 | Shichi et al. | |
| 2009/0114000 A1 | 5/2009 | Hecker et al. | |
| 2009/0189072 A1* | 7/2009 | Egan | G01N 23/2206 250/282 |
| 2009/0280629 A1 | 11/2009 | Tan et al. | |
| 2010/0098922 A1 | 4/2010 | Zani et al. | |
| 2010/0227758 A1 | 9/2010 | Yang et al. | |
| 2011/0037117 A1 | 2/2011 | Ahn et al. | |
| 2011/0065237 A1 | 3/2011 | Bennahmias et al. | |
| 2011/0167913 A1 | 7/2011 | Bennahmias et al. | |
| 2013/0040458 A1 | 2/2013 | Scott et al. | |
| 2013/0181139 A1 | 7/2013 | Eisner et al. | |
| 2016/0310764 A1* | 10/2016 | Bharadwaj | A61N 5/1078 |
| 2022/0272827 A1* | 8/2022 | Zhang | G21K 5/04 |

FOREIGN PATENT DOCUMENTS

| | | |
|---|---|---|
| WO | WO 2002/012443 | 2/2002 |
| WO | WO 2010/144730 | 12/2010 |

OTHER PUBLICATIONS

Aihara et al., "Stabilization of an electrostatic lens for a focused ion beam system," J. Vac. Sci. Technol. B 6 (3), May/Jun. 1988, pp. 958-961.

Arimoto et al., "Energy distributions of liquid metal alloy ion sources," J. Vac. Sci. Technol. B 6 (3), May/Jun. 1988, pp. 919-922.

Bell et al., "A low-current liquid metal ion source," J. Vac. Sci. Technol. B 6 (3), May/Jun. 1988, pp. 927-930.

Brewer et al., Electron-Beam Technology in Microelectronic Fabrication, Academic Press, 1980 [Uploaded in 2 parts].

Carlsten, "Klystron Beam-Bunching Lecture," 1996 US/CERN/ JAPAN Accelerator school, Conf-9609245-1, Los Alamos National Lab, New Mexico.

Chalupka et al., "Novel electrostatic col. for ion projection lithography," J. Vac. Sci. Technol. B 12 (6), Nov./Dec. 1994, pp. 3513-3517.

Chao et al., "Spherical aberration corrector using space charge," J. Vac. Sci. Technol. B 15 (6), Nov./Dec. 1997, pp. 2732-2736.

Chason et al., "Ion beams in silicon processing and characterization," J. Appl. Phys. 81(10), May 15, 1997, pp. 6513-6560.

Chen et al., "Study of H.sup.- beams for ion-projection lithography," J. Vac. Sci. Technol. B 13 (6), Nov./Dec. 1995, pp. 2597-2599.

Corelli et al., "Summary Abstract: Liquid metal ion sources and applications in focused ion beams systems," J. Vac. Sci. Technol. B 6 (3), May/Jun. 1988, p. 936.

Current, "Current Status of Ion Implantation and Techniques for Manufacturing Semiconductor IC Fabrication," Nuclear Instruments and Methods in Physics Research B6 (1985), pp. 9-15.

Dahl et al., "A modular ion beam deflector," International Journal of Mass Spectrometry 189 (1999), pp. 47-51.

Dai, "Binary Lossless Layout Compression Algorithms and Architectures for Direct-Write Lithography Systems," Masters of Science, Plan II, UC Berkeley (2000).

De Marco et al., "Maskless fabrication of JFETs via focused ion beams," Solid-State Electronics 48 (2004), pp. 1833-1836.

Della Ratta et al., "Focused-ion beam induced deposition of copper," J. Vac. Sci. Technol. B (11) 6, Nov./Dec. 1993, pp. 2195-2199.

Dennen et al., "50 KeV e-beam resist characterization for the 100nm lithography node and below," available at www.spie.org/Conferences/programs/01/pm/Conferences.html, 2001.

Edinger et al., "Modeling of focused ion beam induced surface chemistry," J. Vac. Sci. Technol. B 18 (6), Nov./Dec. 2000, pp. 3190-3193.

Edinger et al., "Study of precursor gases for focused ion beam insulator deposition," J. Vac. Sci. Technol. B 16 (6), Nov./Dec. 1998, pp. 3311-3314.

Freyer et al, "Design of an Accurate Production E-Beam System," Solid State Technology, Sep. 1983, pp. 165-170.

Freyer et al., "Enhanced Pattern Accuracy with Mebes III," SPIE vol. 471 Electron-Beam, X-Ray, and Ion-Beam Techniques for Submicrometer Lithographies III (1984), pp. 8-17.

Gamo, "Recent advances of focused ion beam technology," Nuclear Instruments and Methods in Physics Research B 121 (1997), pp. 464-469.

Geraci et al., "High-order maps with acceleration for optimization of electrostatic and radio-frequency ion-optical elements," Review of Scientific Instruments, vol. 73, No. 9, Sep. 2002, pp. 3174-3180.

Gierlings et al., "MONA Merging Optics and Nanotechnologies," Frame of Reference Final Report of Work Package 1, www.ist-mona.org, Nov. 30, 2005, pp. 1-273 [Uploaded in 3 parts].

Gorlachev et al., "K-, L-, and M-shell x-ray productions induced by xenon ions," Nucl. Inst. and Meth. Phys. Res. B 430, pp. 31-35 (2018).

Herlihey, "Micro-Fabrication of Macroscopic Areas Via Maskless and Resistless Focused Ion Beam Lithography," University of Virginia, MS Dissertation, 2005, pp. 1-188.

Hink, "X-ray production by ion bombardment," Revue de Physique Appliquée, Société française de physique, EDP, vol. 11, No. 1, pp. 31-45 (1976).

Humphries, Charged Particle Beams, John Wiley and Sons (ISBN 0-471-60014-8, QC786.H86) 1990, Chapter 15, pp. 720-812.

Ishitani et al., "Favorable source material in liquid-metal-ion sources for focused beam applications," J. Vac. Sci. Technol. B 6 (3), May/Jun. 1988, pp. 931-935.

Ji, "Maskless, Resistless Ion Beam Lithography Processes," A dissertation for Doctor of Philosophy in EECS, UC Berkeley, Spring 2003, pp. 1-128.

(56) References Cited

OTHER PUBLICATIONS

Junphong et al., "The System of Nanosecond 280-keV-He.sup.+ Pulsed Beam," Particle Accelerator Conference (PAC 05), May 16-20, 2005, Knoxville, Tennessee, SLAC-PUB-11847.

Knudson et al., "Aluminum X-Ray Satellite Enhancement by Ion-Impact Excitation," Phys. Rev. Lett. vol. 26, No. 19, pp. 1149-1152 (1971).

Koh, "Characteristics of W films formed by ion beam assisted deposition," J. Vac. Sci. Technol. B 9 (5), Sep./Oct. 1991, pp. 2648-2652.

Komano et al., "Silicon Oxide Film Formation by Focused Ion Beam (FIB)-Assisted Deposition," JJAP vol. 28, No. 11, Nov. 1989, pp. 2372-2375.

Kompfner, "Travelling-Wave Tubes," Rep. Prog. Phys., 1952, pp. 275-327.

Komuro et al., "Focused Ga ion beam etching characteristics of GaAs with Cl.sub.2," J. Vac. Sci. Technol. B 9 (5), Sep./Oct. 1991, pp. 2656-2659.

Komuro et al., "On the mechanism of energy distribution in liquid metal ion sources," J. Vac. Sci. Technol. B 6 (3), May/Jun. 1988, pp. 923-926.

Kubena et al., "A low magnification focused ion beam system with 8 nm spot size", J. Vac. Sci. Technol. B 9 (6), Nov./Dec. 1991, pp. 3079-3083.

Kubena et al., "Selective area nucleation for metal chemical vapor deposition using focused ion beams," J. Vac. Sci. Technol. B 6 (6), Nov./Dec. 1988, pp. 1865-1868.

Li et al., "An Eulerian method for computing multi-valued solutions of the Euler-Poisson equations and applications to wave breaking in klystrons," Submitted to Phys. Rev. E, Mar. 2003, pp. 1-14.

Liu et al., "High-speed focused-ion-beam patterning for guiding the growth of anodic alumina nanochannel arrays," Applied Physics Letters, vol. 82, No. 8, Feb. 2003, pp. 1281-1283.

Liu, "Rapid Nano-Patterning of Polymeric Thin Films With Ga.sup.+ Focused Ion Beam," Ph.D. Dissertation, University of Virginia, Jan. 2005.

Lugstein et al., "Focused Ion Beam Technology—A New Approach for the Sub 100nm Microfabrication Regime," Proc. "Current Developments of Microelectronic," Bad Hofgastein, Mar. 1999, pp. 175-180.

Madokoro et al., "Focused Phosphorus Ion Beam Implantation Into Silicon," Nuclear Instruments and Methods in Physics Research B39 (1989), pp. 511-514.

Matsui et al., "High-Resolution focused ion beam lithography," J. Vac. Sci. Technol. B 9 (5), Sep./Oct. 1991, pp. 2622-2632.

McCord et al., Handbook of Microlithography, Micromachining, and Microfabrication, vol. 1, ISBN 0-8194-2378-5, Published 1997.

Melngailis et al., "A review of ion projection lithography," J. Vac. Sci. Technol. B 16 (3), May/Jun. 1998, pp. 927-957.

Melngailis et al., "Focused Ion Beam Fabrication of Microelectronic Structures," Final Report, U.S. Army Research Office, Contract #DAAL 03-90-G0223, Dec. 30, 1993.

Melngailis, "Ion Sources for Nanofabrication and High Resolution Lithography," Proceedings of the 2001 Particle Accelerator Conference, Chicago SSN 0-7803-7191-7/01 IEEE, pp. 76-80.

Mitan et al., "Direct patterning of nanometer-scale silicide structures on silicon by ion-beam implantation through a thin barrier layer," Applied Physics Letters vol. 78, No. 18, Apr. 30, 2001, pp. 2727-2729.

Morimoto et al., "Focused ion beam lithography and its application to submicron devices," Microelectronic Engineering 4 (1986), pp. 163-179.

Morozov et al., "Conversion efficiencies of electron beam energy to vacuum ultraviolet light for Ne, Ar, Kr, and Xe excited with continuous electron beams," J. Appl. Phys. vol. 103, p. 103301 (2008).

Nagamachi et al., "Focused ion beam direct deposition and its applications," J. Vac. Sci. Technol. B 16 (4), Jul./Aug. 1998, pp. 2515-2521.

Namba, "Focused Ion Beam Processing," Nuclear Instruments and Methods in Physics Research B39 (1989), pp. 504-510.

Narum et al., "A variable energy focused ion beam system for in situ microfabrication," J. Vac. Sci. Technol. B 6 (3), May/Jun. 1988, pp. 966-973.

Paik et al., "Analytical calculation of electrostatic beam blanker performance," J. Phys. E: Sci. Instrum. 20 (1987), pp. 61-66.

Paik et al., "Systematic design of an electrostatic optical system for ion beam lithography," J. Vac. Sci. Technol. B 3 (1), Jan./Feb. 1985, pp. 75-81.

Pease, "Scanning Electron Beam Lithography and Other Microlithography Techniques," Microscience, Scanning Electron Beam Lithography, pp. 245-276, 1981.

Petroff et al., "Nanostructures processing by focused in beam implantation," J. Vac. Sci. Technol. B 9 (6), Nov./Dec. 1991, pp. 3074-3078.

Piggott, "Understanding the physics of coherent LiDAR," arXiv:2011.05313v3 [physics.app-ph] Jan. 22, 2022.

Pinheiro et al., "K- and L-shell theoretical fluorescence yields for the Fe isonuclear sequence," Rad. Phys. and Chem. vol. 203 p. 110594 (2023).

Podest, "The Fundamentals of LiDAR," Applied Remote Sensing Training Program, Jet Propulsion Laboratory, California Institute of Technology, Mar. 16, 2021.

Rau et al., "Shot-noise and edge roughness effects in resists patterned at 10 nm exposure," J. Vac. Sci. Technol. B 16 (6), Nov./Dec. 1998, pp. 3784-3788.

Rauscher, "Development of an Advanced Low Energy Focused Ion Beam System Based on Immersion Optics," Dissertation, Eberhard-Karls-Univeristat zu Tubingen, Jul. 31, 2006.

Ro et al., "Mechanism of ion beam induced deposition of gold," J. Vac. Sci. Technol. B 12 (1), Jan./Feb. 1994, pp. 73-77.

Sakaguchi et al., "Focused ion beam optical column design and consideration on minimum attainable beam size," J. Vac. Sci. Technol. B 16 (4), Jul./Aug. 1998, pp. 2462-2468.

Santamore et al., "Focused ion beam sputter yield change as a function of scan speed," J. Vac. Sci. Technol., B 15 (6), Nov./Dec. 1997, pp. 2346-2349.

Saris et al., "Cross Sections for Ar L-Shell and Ne K-Shell X-Ray Emission in Heavy Ion-Atom Collisions," Physica vol. 49, pp. 441-460 (1970).

Sato et al., "A method for calculating the current density of charged particle beams and the effect of finite source size and spherical and chromatic aberrations of the focusing characteristics," J. Vac. Sci. Technol. B 9 (5), Sep./Oct. 1991, pp. 2602-2608.

Sawaragi et al., "Development of a focused ion beam system: Current status and future prospects," J. Vac. Sci. Technol. B 6 (3), May/Jun. 1988, pp. 962-965.

Schachter, "Advanced Acceleration Concepts," Technion—Israel Institute of Technology, Presented at CERN, Oct. 2002.

Schwank et al., "BUSFET—A Novel Radiation-Hardened SOI Transistor," IEEE Transactions on Nuclear Science, vol. 46, No. 6 (1999), SAND99-0323J.

Shinada et al., "Improvement of Focused Ion-Beam Optics in Single-Ion Implantation for Higher Aiming Precision of One-by-One Doping of Impurity Atoms into Nano-Scale Semiconductor Devices," JJAP vol. 41, Part 2, No. 3A, Mar. 1, 2002, pp. L287-L290.

Shiokawa et al., "40 nm Width Structure of GaAs Fabricated by Fine Focused Ion Beam Lithography and Chlorine Reactive Ion Etching," JJAP vol. 27, No. 6, Jun. 1988, pp. L1160-L1161.

Sills et al., "E-Beam System Metrology," Solid State Technology, Sep. 1983, pp. 191-196.

Smirnov et al., "An Operative Measurement of RF Parameters for Slow-Wave Systems," Russian Research Center "Kurchatov Institute," EPAC 1994/1995, pp. 1995-1997.

Stanishevsky, "Patterning of diamond and amorphous carbon films using focused ion beams," Thin Solid Films 398-399 (2001), pp. 560-565.

Stenning et al., "The Pathfinder Program and Its Application to Ion Optics," Department of Physical Science, University of Reading Berkshire, May 1968, pp. 1-60.

(56) References Cited

OTHER PUBLICATIONS

Sugimoto et al., "In situ overgrowth on GaAs patterned by focused-ion-beam-assisted Cl.sub.2 etching," J. Vac. Sci. Technol. B 9 (5), Sep./Oct. 1991, pp. 2703-2707.
Szilagyi et al., "Optimum design of electrostatic lenses," J. Vac. Sci. Technol. B 6 (3), May/Jun. 1988, pp. 953-961.
Szilagyi, "Synthesis of electron and ion optical columns," J. Vac. Sci. Technol. B 9 (5), Sep./Oct. 1991, pp. 2617-2621.
Szilagyi, Electron Beam And Electron Optics, Chapter 4, Plenum, New York, 1988, pp. 4-1-4-31.
Tanis et al., "Projectile Fluorescence Yields in Heavy Ion Collisions," Phys. Lett. vol. 67A, No. 2, pp. 124-126 (1978).
Tian et al., "On Mask Layout Partitioning for Electron Projection Lithography," 0-7803-7607, Feb. 2, 2002, IEEE.
Tobias et al., "Electron-beam lithography three-mark silicon automatic registration capabilities for process distortion compensation," J. Vac. Sci. Technol. 21 (4), Nov./Dec. 1982, pp. 999-1004.
Tolk et al., "Photon emission from low-energy ion and neutral bombardment of solids," Rad. Effects vol. 18, No. 3-4, pp. 221-229 (1973).
Tsumagari et al., "Design of a low-aberration lens for focused ion beams," J. Vac. Sci. Technol. B 6 (3), May/Jun. 1988, pp. 949-952.
Turnbull, "Direct spherical and chromatic aberration correction for charged particle optical systems," J. Vac. Sci. Technol. B 22 (6), Nov./Dec. 2004, pp. 3560-3564.
Wadlinger, "Beam-Bunching with a Linear-Ramp Including Space-Charge Force Effects Cylinder Model," Accelerator Operations and Technology Division, Los Alamos National Laboratory, 1996.
Wang, "Design optimization for two lens focused ion beam columns," J. Vac. Sci. Technol. B 15 (4), Jul./Aug. 1997, pp. 833-839.
Watanabe et al., "RF Beam Buncher for the HiECR Ion Source," Unpublished-University of Tokyo, p. 72, (2003).
Watt et al., "Ion Beam Lithography and Nanofabrication: A Review," International Journal of Nanoscience, vol. 4, No. 3, (2005), pp. 269-286.
Weiner et al., "Fabrication of sub-40-nm p-n junctions for 0.18 .mu.m MOS device applications using a cluster-tool-compatible, nanosecond thermal doping technique," SPIE vol. 2091, 0-8194-1362-5/94, pp. 63-70, 1994.
Yang et al., "Gray-Scale Electron-Beam Lithography," 2005 NNIN REU Research Accomplishments, pp. 160-161.
Yoon et al., "Duty Cycle and Modulation Efficiency to Two-Channel Hadamard Transform Time-of-Flight Mass Spectrometry," 2005 American Society for Mass Spectrometry, 1044-0305/05, pp. 1888-1901.
Zani et al., "Focused ion beam high Tc superconductor dc SQUIDs," Appl. Phys. Lett. 59 (2), Jul. 8, 1991, pp. 234-236.
Zavecz et al., "A Comprehensive Test Sequence for the Electron Beam Exposure System," Solid State Technology, Feb. 1982, pp. 106-110.

\* cited by examiner

12,493,005 B1

EXTENDED RANGE ACTIVE ILLUMINATION IMAGER

CLAIM OF PRIORITY

This application claims the benefit of U.S. Provisional Appl. No. 63/365,985 filed Jun. 7, 2022, which is incorporated in its entirety by reference herein.

BACKGROUND

Field

The present application relates generally to range gated scanning with a particle beam to illuminate an object for high resolution imaging, and more specifically, to methods and apparatuses for time synchronized scanning leading to stimulated emission and range detection.

Description of the Related Art

Active imaging is a well-known method, conceptualized since the 1960s, using projected light on an object and measuring the time for the reflected light to return to the receiver to obtain an increased resolution or three-dimensional (3-D) image of the object (see, e.g., "New Radar System," Odessa American, 28 Feb. 1961; Macomber, Frank, "Space Experts Seek Harness for Powerful LASER Light," Bakersfield Californian, p. 5, Jun. 3, 1963 (Copley News Service, retrieved 11 Jul. 2019). Active imaging has broadly been used in commercial applications for surveying land, and more recently in automated vehicle operation. Altering the metrics of the illuminating beam (e.g., focus; pulse frequency) provides a method to improve the determination of the X, Y, and Z axis dimensions and/or location of the scanned object. Similarly, altering the illumination beam spot size, associated flux density, and wavelength can change the reflectance intensity per pixel of the return signal, providing a path to high resolution imaging of objects at extended ranges.

Active imaging systems have typically operated in the visible or infrared spectrum, have had limited resolution due to wavelength, and have relied on the illuminating beams reflectance off the surface of the object to provide a return signal.

SUMMARY

In certain implementations, a particle beam illuminating system comprises a beam steering control subsystem configured to receive charged particles and to generate and scan a particle beam over at least a portion of a target located a distance of at least 10 meters from the beam steering control subsystem. The system further comprises a beam charge control subsystem configured to receive the particle beam from the beam steering control subsystem and to control an output charge of the particle beam impinging the target.

In certain implementations, a system comprises a charged particle beamline configured to project, focus, and control a particle beam. The system further comprises a beam steering control subsystem configured to direct and scan the particle beam to impinge a target at a distance greater that 10 meters from the charged particle beamline. The system further comprises a beam charge control subsystem configured to control an output charge of the particle beam. The system further comprises at least one illumination sensor configured to receive an illuminated optical signal generated by the particle beam impinging the target

BRIEF DESCRIPTION OF THE DRAWINGS

These and other features, aspects, and advantages are described herein with reference to the drawings, which are intended for illustrative purposes and should in no way be interpreted as limiting the scope of certain implementations. Furthermore, various features of different disclosed implementations can be combined to form additional implementations, which are part of this disclosure. In the drawings, like reference characters can denote corresponding features throughout similar implementations. The following is a brief description of each of the drawings.

DETAILED DESCRIPTION

Figure 1A:
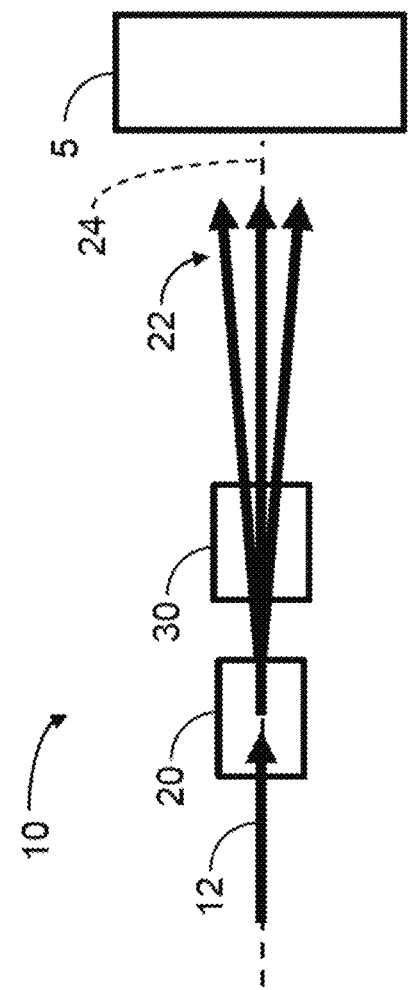
FIGS. 1A and 1B schematically illustrate two examples of a particle beam illuminator system in accordance with certain implementations described herein.

The following description is given by way of example, and not limitation. Although certain example implementations are disclosed below, it will be understood by those in the art that the present disclosure extends beyond the specifically disclosed implementations and/or uses of the implementations and obvious modifications and equivalents thereof. For example, one skilled in the art could devise variations that are within the scope and spirit of the invention disclosed herein. Further, the various features of the implementations disclosed herein can be used alone, or in varying combinations with each other and are not intended to be limited to the specific combination described herein. Thus, it is intended that the scope of the present disclosure and the scope of the claims should not be limited by the particular disclosed implementations described below.

Certain implementations described herein include a particle beam projector (e.g., charged particle beam projector) configured to be used as an extended range active illumination imager. The projector comprises a charged particle source configured to generate charged particles and a beamline configured to receive charged particles from the charged particle source and to act on the received charged particles to form a particle beam (e.g., by focusing and/or grouping the charged particles into bunches or pulses) and to deflect (e.g., steer) the particle beam towards a target (e.g., object to be illuminated).

In certain implementations, the charged particle source and/or the beamline comprises a charged particle filter configured to receive the charged particles, to allow further propagation of a predetermined charged particle species of a plurality of charged particle species generated by the charged particle source and to inhibit (e.g., block) further propagation of other charged particle species generated by the charged particle source.

In certain implementations, the beamline comprises a first plurality of electrodes configured to focus the charged particles into the particle beam and a second plurality of electrodes (e.g., as part of a beam buncher or a charged particle buncher) configured to group the charged particles into bunches (e.g., pulses). The beam buncher can include a periodic potential waveform generator in electrical communication with the second plurality of electrodes to apply a quasi-electrostatic time-varying potential between adjacent electrodes of the second plurality of electrodes, generating an adiabatic spatial distribution of the charged particles that comprises a plurality of nodes and antinodes of the particle beam (e.g., the potential causing adiabatic velocity changes of the charged particles to form the plurality of nodes and antinodes of the particle beam in a continuous and repetitive spatial distribution throughout propagation of the particle beam).

In certain implementations, the beamline further comprises a charged particle deflector configured to generate deflecting forces (e.g., using electric and/or magnetic fields) configured to steer (e.g., deflect) the charged particles of the particle beam. For example, the deflecting forces generated by the charged particle deflector can be temporally synchronized with the antinodes of the charged particle spatial distribution (e.g., generating an independent force) to steer the particle beam.

In certain implementations, the projector further comprises a beam charge reducer (e.g., as part of the beamline) configured to change (e.g., reduce) a net charge of the particle beam. For example, the beam charge reducer can deliver bursts of neutralizing particles (e.g., second charged particles having opposite charge to the charged particles of the particle beam), the bursts synchronized with the antinode beam bunch time-of-flight to neutralize at least some of the charged particles of the bunches. For example, the resulting particle beam propagating from the beam charge reducer can be substantially neutral.

In certain implementations, the projector further comprises an illumination detector configured to detect a signal (e.g., stimulated emission return signal) from the target, the signal indicative of at least a portion of the particle beam impinging at least a portion of the target. For example, the illumination detector can have a sensitivity that covers a spectrum of photon emission caused by at least a portion of the particle beam impinging at least a portion of the target.

Figure 1B:
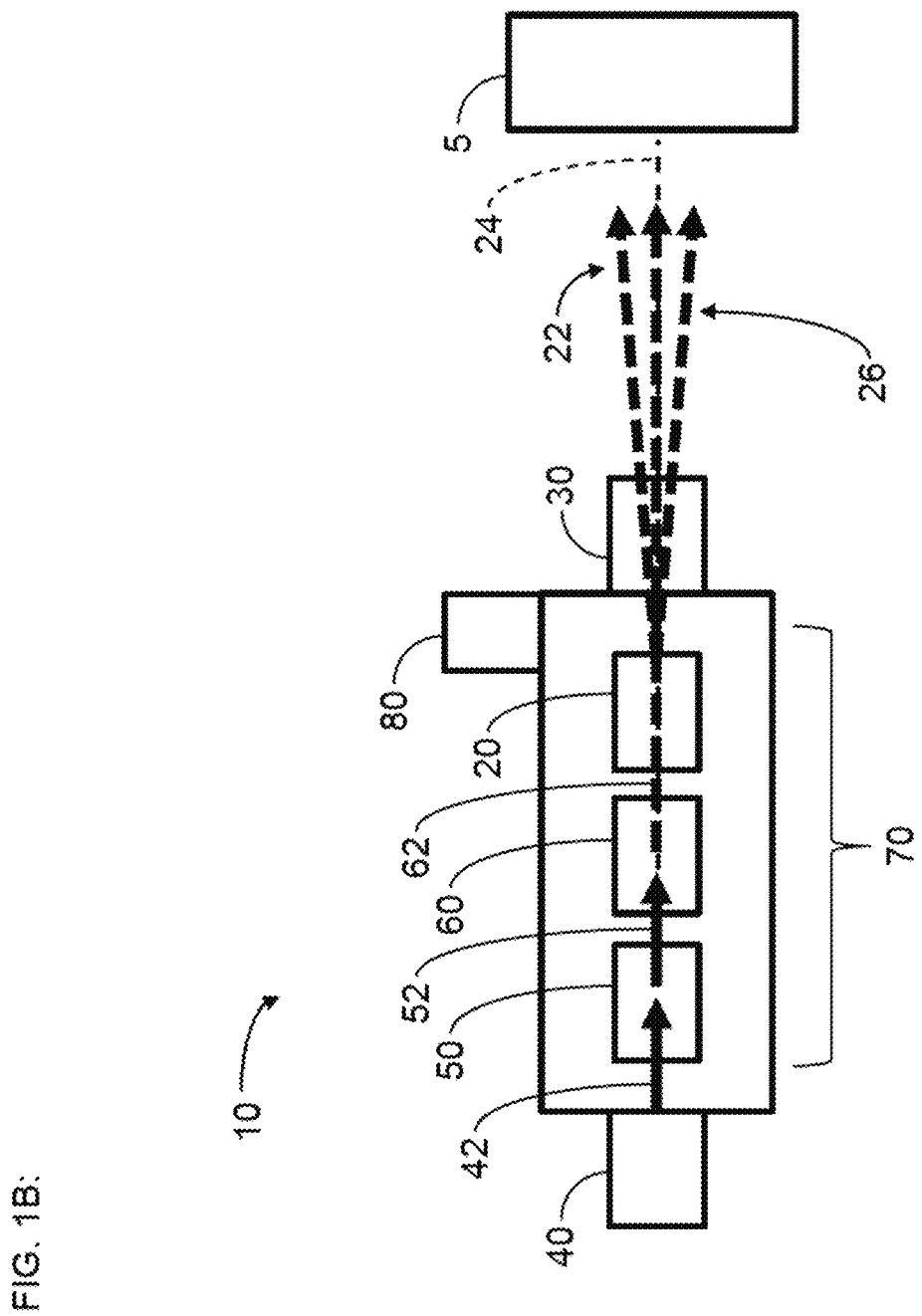

FIGS. 1A and 1B schematically illustrate two examples of a particle beam illuminator system 10 (e.g., particle beam projector; extended range active illumination imager) in accordance with certain implementations described herein. The system 10 comprises a beam steering control subsystem 20 (e.g., beam deflector) configured to receive charged particles 12 and to generate and scan a particle beam 22 over at least a portion of a target 5 located a distance of at least 10 meters from the beam steering control subsystem 20. The system 10 further comprises a beam charge control subsystem 30 (e.g., charge reducer) configured to receive the particle beam 22 from the beam steering control subsystem 20 and to control an output charge of the particle beam 22 impinging the target 5. In certain implementations, the system 10 is configured to project, focus, and control the particle beam 22 propagating along a propagation axis 24.

In certain implementations, as schematically illustrated by FIG. 1B, the system 10 further comprises a charged particle source 40 configured to provide charged particles 42 in a plurality of particle species, a particle filter 50 configured to receive the charged particles 42 and to controllably select charged particles 52 of an individual particle species, a beam buncher 60 configured to receive the selected charged particles 52 and to generate a segmented beam pulse train 62 and to provide the beam pulse train 62 to the beam steering control subsystem 20. As schematically illustrated by FIG. 1B, the particle beam 22 can comprise a plurality of beam bunches 26 that impinge the target 5. The particle filter 50, the beam buncher 60, and the beam charge control subsystem 30 can be components of a beamline 70, as schematically illustrated by FIG. 1B. In certain implementations, the charged particle source 40 is configured to provide charged particles 42 in a single particle species (e.g., the charged particle source 40 self-filters the charged particles 42 to comprise a single particle species), and the system 10 does not comprise a particle filter 50 (e.g., the charged particles 42 from the charged particle source 40 are received directly by the beam buncher 60). In certain implementations, as schematically illustrated by FIG. 1B, the system 10 further comprises at least one detector 80 (e.g., optical sensor) configured to detect stimulated emission from the target 5 resulting from impinging at least a portion of the particle beam 22 onto at least a portion of the target 5.

In certain implementations, the system 10 is configured to generate and project the particle beam 22 at an extended range (e.g., over a distance of at least 10 meters) to a surface 26 of the target 5 (e.g., transferring energy to the surface atoms of the target 5). The particle beam 22 can cause stimulated photon emission from the surface atoms, thereby illuminating the target 5. In certain such implementations, by creating and utilizing stimulated photon emission from the target 5, the system 10 provides active extended range imaging of the target 5 having high resolution (e.g., centimeter to sub-millimeter) and/or configured to image the target 5 through clutter.

In certain implementations, the system 10 is configured to actively illuminate targets 5 in a wide range of imaging applications (e.g., 3-D; high resolution), including but not limited to: military and space applications utilizing extended distance and resolution (e.g., spacecraft; satellites; missiles); semiconductor industry applications (e.g., wafers; integrated circuits); biomedical research applications utilizing high resolution and high signal intensity (e.g., greater than 1 ampere/cm$^2$); navigation through clutter applications; maritime applications (e.g., ships; boats); aviation applications (e.g., airplanes); competitive sports applications; mining applications. The target 5 being imaged can be stationary or moving while being exposed to the particle beam 22. For example, the target 5 can be continuously moving at a rate in a range of 0.1 centimeter/second to 25 centimeters/second, in a range of 25 centimeters/second to 100 centimeters/second, or in a range of 1 meter/second to 10,000 meters/second.

In certain implementations, the target 5 is downstream of the system 10 (e.g., downstream of the beam charge control subsystem 30; downstream of the downstream-most component of the beamline 70). The distance between the target 5 and the system 10 (e.g., the distance between the target 5 and the beam charge control subsystem 30; the distance between the target 5 and the downstream-most component of the beamline 70) is in a range of 1 centimeter to 5 centimeters, a range of 5 centimeters to 10 centimeters, a range of 10 centimeters to 1 meter, in a range of 1 meter to 10 meters, in a range of 10 meters to 100 meters, in a range of 100 meters to 1 kilometer, in a range of 1 kilometer to 1000 kilometers, or in a range of 1000 kilometers to 10,000 kilometers. In certain implementations, the particle beam 22 impinging the target 5 has a beam density greater than or equal to $6 \times 10^{18}$ particles per second per centimeter squared.

Charged Particle Source

In certain implementations, the charged particle source 40 is configured to provide charged particles 42 in a high current density charged particle beam (e.g., greater than or equal to 1 ampere/cm$^2$) or charged particles 42 having sufficient particle flux to support the formation of a high current density charged particle beam by one or more downstream components (e.g., particle filter 50; beam buncher 60; beam steering control subsystem 20; and/or beam charge control subsystem 30). The charged particle source 40 can be configured to generate a time evolving modulated amplitude output.

For example, the charged particle source 40 can comprise a liquid metal ion source (LMIS) comprising a heated reservoir of liquid metal and a needle protruding outwardly from the reservoir. The liquid metal can flow from the reservoir to the tip of the needle by capillary action, and an electric field from an extraction electrode can pull the liquid metal at the tip of the needle into a sharp cusp (e.g., a "Taylor Cone") from which ions (e.g., the charged particles 42) are emitted. The LMIS can provide a point source that is very bright (e.g., about $10^9$ A/steradian/cm$^2$), and with suitable optics, the ion beam diameter can be as small as 2 nanometers. A variety of liquid metal alloys can provide several ion species common for the application of LMIS supporting active illumination.

Other example charged particle sources 40 compatible with certain implementations described herein include, but are not limited to: a plasma ion source (PIS); a volume plasma ion source (VPIS); a gas field ionization source (GFIS); a carbon nanotube field emitter; a free electron laser and a substrate irradiated by the free electron laser; a pulsed laser ablation ion source; a magnetically confined plasma anode (MAP) source; and a thermal field emission (TFE) electron source.

In certain implementations, accelerating and focusing a distributed energy of charged particles 42 (e.g., ions) by the charged particle source 40 can introduce chromatic aberrations resulting in a loss of current density efficiency of the system 10. For example, the ion beam full-width-half-max (FWHM) energy distribution from an LMIS used as the charged particle source 40 can be as much as 12%, while the current density efficiency, long-term stability, and short-term stability of the LMIS can be sufficient for a charged particle source 40 of the system 10. In certain implementations, the system 10 is configured to utilize the energy distribution of the charged particles 42 (e.g., high and low energy trails) from the charged particle source 40 by advantageously grouping the charged particles 42 having differing energies, as described herein.

Various mechanisms can contribute to the broadening of the charged particle energy distributions. For example, effects related to the formation of the ions can broaden the energy distribution. Ion emissions from an LMIS are formed either by direct field desorption of an ion at the emitter tip or by field ionization of desorbed atoms at some distance from the emitter tip. Ions generated close to the tip surface can exchange charge with neutral atoms further downstream, forcing a zero-energy ion at that point. Since the electric field in the emitter area is high (e.g., between about 20 and 50 Volts/nm), ions formed at different distances from the emitter can have different energies.

For another example, space charge forces after ion formation by the charged particle source 40 can broaden the energy distribution of the charged particles 42, particularly at low velocities. In certain such implementations, the beamline 70 can be configured to accelerate the charged particles 42 (e.g., ions) to a predetermined energy after formation. In addition, high- and low-mass species from the charged particle source 40 can be utilized when appropriate. Space charge effects can also be aggravated by higher currents. For example, the width of the ion energy distribution of an LMIS can be proportional to the current to the 2/3 power (e.g., practical application of an LMIS can show behavior similar to electron beams).

Various techniques can be used to improve the lifetime and/or the current stability of the charged particle source 40 as compared to a conventional LMIS, such that the lifetime and/or the current stability are not barriers to use of the charged particle source 40 in the system 10. For example, a conventional LMIS can have a Taylor cone emission that unpredictably drifts in a figure-8 pattern over about a one-hour period, similar to the drift of an electron beam. Undetected, this drift could cause scan placement errors when scanning the particle beam 22 over extended ranges. In certain implementations, the charged particle source 40 comprises an LMIS that is operated at low temperature, thereby decreasing the neutral atom density in the proximity of the tip and reducing (e.g., minimizing) the broadening of the energy distribution associated with ion formation. The low temperature can also increase the lifetime of the LMIS, thereby reducing the frequency of source replacement. In certain other implementations, the charged particle source 40 comprises a low vapor pressure species (e.g., a doubly ionized species that has a low charge exchange cross-section and that is formed at the surface of the tip) that has a narrow energy distribution. Using such a low vapor pressure species can also advantageously provide a small virtual source size. Other techniques for improving the lifetime and/or the current stability of the charged particle source 40 can also be used.

An extended lifetime of the charged particle source 40 can be achieved by conditioning the parameters that drive the charged particle source 40 prior to operation. For example, the incorporation of an automated conditioning routine can contribute to the extended life and stability of the charged particle source 40. For another example, a continuous flow strategy, such as impregnated electrode-type needles with hardened tips, can further extend the life span of the charged particle source 40. Second-order effects of improved life span can include emission current and position stability improvement. Source emission position stability can be successfully corrected by using error feedback from occasional beam registrations and adjustment to source servomotors. Although increased ion beam current density can be desired, in certain implementations, the beamline 70 does not increase the beam current density.

Particle Filter

In certain implementations in which the charged particle source 40 is configured to generate charged particles 42 in a plurality of charged particle species (e.g., ion species), the particle filter 50 (e.g., spectrometer filter) is configured to controllably select charged particles 52 of an individual particle species (e.g., for specific processing applications) by filtering the stream of charged particles 42. For example, the particle filter 50 can comprise a mass separator configured to deflect selected ion species into a mass separator aperture plate. The mass separator of certain implementations comprises a reflective optic, an ExB lens, and/or a Wein filter. As schematically illustrated by FIG. 1B, the particle filter 50 can be between the charged particle source 40 and the beam buncher 60. In certain implementations, the particle filter 50 comprises the beam buncher 60.

Beam Buncher

Example beam bunchers 60 and example methods of operating beam bunchers 60 compatible with certain implementations described herein are disclosed in U.S. Pat. No. 7,259,373, which is incorporated in its entirety by reference herein. Bunching charged particles can allow write strategy optimization with dose variations at the charged particle level by varying the beam buncher frequency, amplitude, and duty cycle, which in turn vary the charged particle density, as described herein. The beam buncher parameters can therefore be adjusted according to the beam scan strategy.

While the beam buncher 60 is described herein as receiving the selected charged particles 52 from the particle filter 50, in certain implementations in which the charged particle source 40 is configured to provide charged particles 42 in a single particle species, the system 10 does not comprise a particle filter 50 and the beam buncher 60 receives the charged particles 42 directly from the charged particle source 40.

In certain implementations, the beam buncher 60 comprises a radio frequency (RF) beam buncher configured to receive a stream of charged particles (e.g., the selected charged particles 52 from the particle filter 50), the beam buncher 60 comprising at least one pair of electrodes separated by at least one buncher gap through which the charged particles propagate and are acted upon by an alternating potential waveform (e.g., RF or multiple modulating potential, beat wave, harmonic, variable, or a combination thereof) applied by the at least one pair of electrodes. For example, the beam buncher 60 can comprise a plurality of buncher electrodes and a plurality of buncher gaps. The electrodes can be configured to selectively apply a potential across the buncher gap between the electrodes to change the characteristics of the beam bunch (e.g., pulse; segment). For example, a potential can be applied by electrodes across a buncher gap of 1 micron to create antinodes with a lower charged particle density and applied by electrodes across a buncher gap of 3 centimeters to create antinodes with a higher charged particle density (e.g., greater than or equal to 0.1 ampere/cm$^2$).

Velocity modulation by the beam buncher 60 can compress the charged particles together in the longitudinal direction (e.g., along the propagation axis 24) so that they form spatially and temporally resolved discrete bunches 26 (e.g., groups; pulses; segments) of charged particles. For example, if unaltered after propagating through the beam buncher 60, the charged particles begin to form bunches 26 having lengths and separations (e.g., spacings) between consecutive bunches 26 that depend on how far the charged particles have traveled after passing through the beam buncher 60. The charged particles of a bunch 26 can be fully compressed in the longitudinal direction when they reach the target 5. The energy applied by the beam buncher 60 can be determined by the difference between the initial energy of the stream of charged particles received by the beam buncher 60 (e.g., the selected charged particles 52 from the particle filter 50) and the final energy of the temporally and spatially resolved bunches 26 of the beam pulse train 62.

In certain implementations, the beam buncher input parameters (e.g., beam energy, beam current, buncher frequency, and gap length) are configured to provide predetermined beam buncher output characteristics (e.g., separation between consecutive bunches 26, length per bunch 26, and charge density per bunch 26). For example, the beam buncher 60 can be operated to provide a predetermined number of charged particles per bunch 26 (e.g., by holding the buncher gap, frequency, and beam energy substantially constant while the beam current is adjusted and by holding the beam energy and buncher current substantially constant while the buncher gap and frequency are adjusted).

For another example, the frequency and the buncher gap length can be configured to match a mean velocity of the bunches 26 of the beam pulse train 62. The applied potential can modulate the longitudinal velocity of each charged particle passing through the buncher gap so that some charged particles (e.g., charged particles with a lower velocity than the mean velocity) are accelerated while other charged particles (e.g., charged particles with a higher velocity than the mean velocity) are decelerated to temporally resolve the bunch. The gap length of the buncher gap, the magnitude and frequency of the applied potential, and the time of flight (TOF) of the charged particles through the beamline 70 can determine the characteristics of the particle beam 22 and the bunches 26 of the particle beam 22 impinging the surface of the scanned target 5. In certain implementations, the beam buncher 60 comprises a helical coil that is modulated with a current frequency, resulting in a magnetic field, and the longitudinal spacing (e.g., gap) between turns of the coil can correspond to the buncher gap. The frequency and longitudinal spacing between turns of the coil can be configured to match a mean velocity of the particle beam 22.

The maximum current density achievable by a system 10 utilizing an LMIS can be limited due to chromatic aberration of the energy distribution of the charged particles 42 (e.g., ion beam) (e.g., from the charged particle source 40 and/or the upstream ion optical components of the beamline 70). In certain such implementations, the beam buncher 60, positioned downstream from the charged particle source 40 and the particle filter 50, is configured to adiabatically adjust a longitudinal spacing between the selected charged particles 52 (or the charged particles 42 in a system 10 without a particle filter 50), creating temporally and spatially resolved bunches 26 of the beam pulse train 62 along the propagation axis 24 (e.g., by effectively slowing down faster moving particles and speeding up slower moving particles) to obtain a substantially uniform velocity. In this way, the beam buncher 60 can provide a substantially uniform energy distribution (e.g., accelerating voltage) within each beam bunch (e.g., below 100 eV), thereby reducing the effects of the chromatic aberration of the energy distribution of the charged particles 42.

In certain implementations, the beam buncher 60 is configured to create a continuously repetitive beam pulse train 62 comprising discrete bunches 26 (e.g., pulses; groups; segments) of at least one charged particle species by adjusting a longitudinal spacing between the charged particles along the propagation axis 24. In certain implementations, the beam buncher 60 is configured to create bunches 26 each comprising between about 1 and 7,000,000 charged particles, between about 1 and 100,000 charged particles, between about 1 and 50,000 charged particles, or between about 1 and 10,000 charged particles. In certain implementations, the beam buncher 60 is configured to create longitudinal spacings (e.g., along the propagation axis 24) between consecutive bunches 26 of the beam pulse train 62 of less than about 10 meters, less than about 1 meter, less than about 10 centimeters, less than about 10 millimeters, less than about 1 millimeter, less than about 500 microns, less than about 300 microns, less than about 100 microns, less than about 10 microns, less than about 100 nanometers, less than about 10 nanometers, or less than about 1 nanometer. The longitudinal spacings between consecutive bunches 26 of the beam pulse train 62 can be substantially equal to one another, substantially unequal to one another, can vary periodically, can vary harmonically, etc. In certain implementations, the beam buncher 60 is configured to create longitudinal widths (e.g., along the propagation axis 24) of each bunch of the beam pulse train 62 between about 1 nanometer and 10 meters, between about 1 nanometer and 1 meter, between about 1 nanometer and 10 centimeter, between about 1 nanometer and 10 millimeters, between about 1 nanometer and 1 millimeter, between about 1 nanometer and 500 microns, between about 1 nanometer and 300 microns, between about 1 nanometer and 100 microns, between about 1 nanometer and 10 microns, between about 1 nanometer and 100 nanometers, or between about 1 nanometer and 10 nanometers. The longitudinal widths of the bunches 26 of the beam pulse train 62 can be substantially equal to one another, substantially unequal to one another, can vary periodically, can vary harmonically, etc.

In certain implementations, the beam buncher 60 is configured to apply electromagnetic radiation having a predetermined frequency to the selected charged particles 52 and to modulate at least one parameter of the electromagnetic radiation (e.g., amplitude; frequency; combinations thereof). The frequency can be in a range of about 1 MHz to 100 GHZ (e.g., in a range of about 1 MHZ to 25 GHZ). In certain other implementations, the beam buncher 60 is configured to apply a beat wave to a plasma comprising the selected charged particles 52, to apply space charges to wake fields, to resonantly absorb the space charges, and/or to apply a pulsed incident neutralizing beam to the selected charged particles 52. In certain other implementations, the beam buncher 60 is configured to modulate an on/off state of the charged particle source 40, to modulate a position of the charged particle source 40 longitudinal to the propagation axis 24 so as to displace the bunches 26 of charged particles as they hit the target 5, and/or to apply a pulsed laser beam to the charged particle source 40.

In certain implementations, the beam buncher 60 comprises a beam blanker configured to create the beam pulse train 62 by alternatively blocking (e.g., absorbing) some selected charged particles 52 from propagating through the beam blanker and allowing other selected charged particles 52 to propagate through the beam blocker at predetermined intervals (e.g., from continuous steady-state to controlled intervals up to 100 GHZ). For example, the beam blanker can comprise at least one electrode and an aperture plate positioned proximate to the propagation path of the selected charged particles 52. The aperture plate can comprise at least one aperture and the aperture plate can be initially positioned such that the selected charged particles 52 propagate through the at least one aperture proximate to an interior edge of the aperture plate. The electric potential of the at least one electrode can be alternatively switched (e.g., at a speed sufficient to create the beam pulse train 62; in a range of 1 kHz to 100 GHz) to alternatively deflect the selected charged particles 52 into the aperture plate (e.g., thereby intercepting the selected charged particles 52) and to not deflect the selected charged particles 52 into the aperture plate (e.g., thereby allowing the selected charged particles 52 to propagate through the at least one aperture) to create temporally and spatially resolved beam bunches 26 of the beam pulse train 62. If unaltered thereafter, the bunches 26 of the beam pulse train 62 continue to travel with length and separation regardless of how far the charged particles have traveled after passing through the beam blanker. While in certain implementations, the beam buncher 60 comprises the beam blanker, in certain other implementations, the beam blanker is separate from the beam buncher 60 (e.g., the beam buncher 60 can be downstream from a collimator of the beamline 70 to have a divergence below 100 microradians and the beam blanker can be downstream from the beam buncher 60). Other configurations of the beam buncher 60 and beam blanker are also compatible with certain implementations described herein. In addition, the various configurations of the beam buncher 60 described herein can be combined with one another in accordance with certain implementations described herein.

Beamline

In certain implementations, the beamline 70 comprises the components of the system 10 between the charged particle source 40 and the beam charge control subsystem 30. For example, the beamline 70 can comprise the beam steering control subsystem 20 and other components (e.g., beam filter 50; beam buncher 60).

In certain implementations, the beamline 70 is configured to modify (e.g., collimate; focus) the stream of charged particles 42 emanating from the charged particle source 40 and to direct the charged particles 42 to propagate along a propagation axis 24. In certain implementations, the beamline 70 comprises an aperture configured to shape the particle beam 22. In certain implementations, the beamline 70 is configured to accelerate the particle beam 22 using an accelerating potential in a range greater than 5 keV (e.g., in a range of 5 keV to 5 GeV; in a range of 0.1 MeV to 10 MeV). A voltage of the beamline 70 can be additive to additional voltages (e.g., applied by an exit aperture of the beamline 70).

In certain implementations, the beamline 70 comprises a variety of combinations of particle beam optical elements (e.g., two or more lenses; a lens and a reflective optic). For example, the beamline 70 can comprise an objective lens assembly between the beam steering control subsystem 20 and the target 5 (e.g., the target 5 downstream from the objective lens assembly). The objective lens assembly can comprise a lens, a mirror, a reflective optic, a combination reflective optic and refractive lens, a combination reflective optic and deflection electrodes, a combination deflection electrode and refractive lens, combinations of the same, and the like. In certain implementations, the objective lens assembly comprises a diffractive lens assembly or a deflector electrode assembly configured to demagnify, focus, and/or deflect the bunches 26 (e.g., pulses; groups; segments) of the particle beam 22. For example, bunches 26 having diameters (e.g., spot size) of about 1 mm can be reduced by a factor of about 10 to have diameters of about 100 microns. The objective lens assembly can also be configured to demagnify the bunches 26 by a factor in a range of 100 to 1,000. In certain implementations, the objective lens assembly is configured to perform a "major field" deflection of the bunches 26. For example, a field perimeter of the objective lens assembly can be defined as a major deflection field in a direction substantially perpendicular from the propagation axis 24 (e.g., deflected in the x- and/or y-directions from a center of the propagation axis 24 in the z-direction).

Beam Steering Control Subsystem

Figure 2:
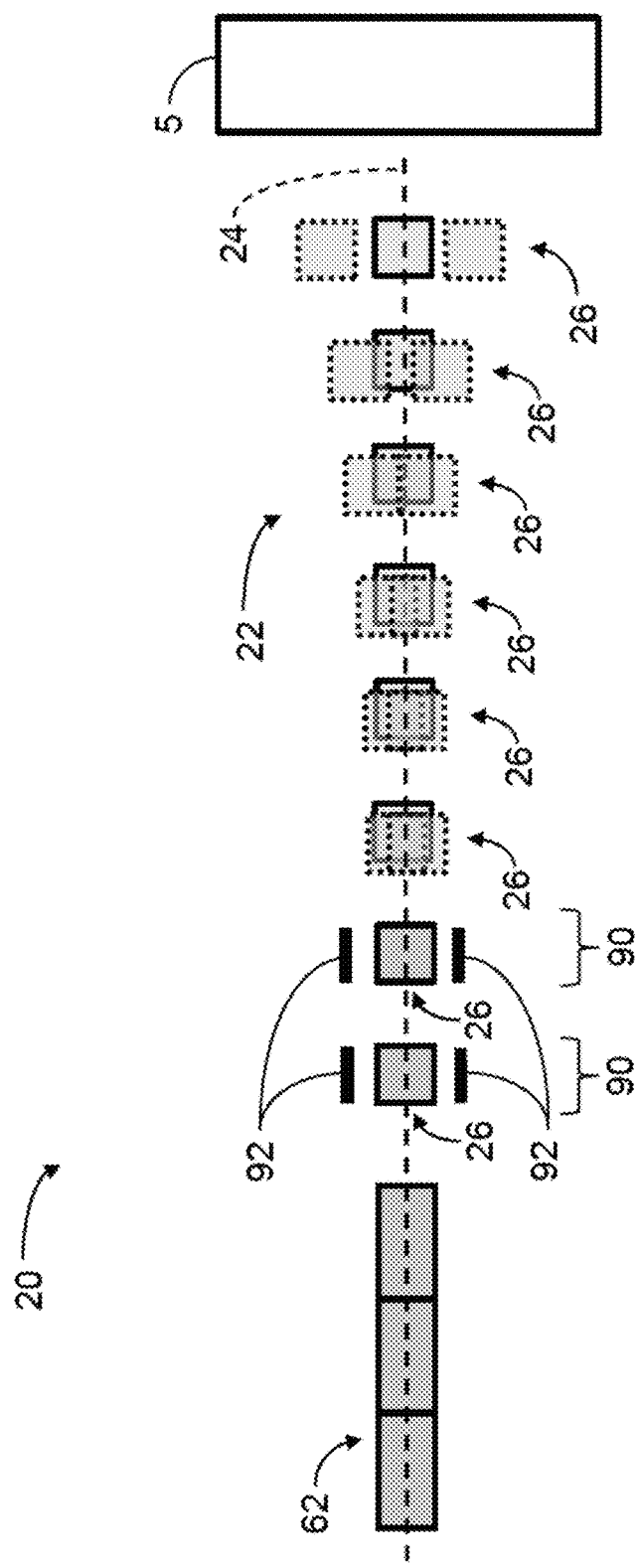
FIG. 2 schematically illustrates a top view of an example beam steering control subsystem in accordance with certain implementations described herein.

FIG. 2 schematically illustrates a top view of an example beam steering control subsystem 20 (e.g., beam deflector) in accordance with certain implementations described herein. For clarity, FIG. 2 does not show other components of the system 10 upstream from the beam steering control subsystem 20 (e.g., the charged particle source 40, beam filter 50, beam buncher 60) or other components of the system 10 downstream from the beam steering control subsystem 20 (e.g., beam charge control subsystem 30). Other configurations are also compatible with certain implementations described herein. The example beam steering control subsystem 20 sequentially separates a beam pulse train 62 into bunches 26 then synchronizes the bunches 26 with the deflection time-of-flight to scan the particle beam 22 across the target 5.

In certain implementations, the beam steering control subsystem 20 comprises one or more deflection stages 90 (e.g., electrode stages, magnetic stages) positioned longitudinally along the propagation axis 24 of the system 10 and configured to scan the particle beam 22 across a surface area of the target 5. The one or more deflection stages 90 are configured to receive charged particles (e.g., beam pulse train 62) and to deflect individual bunches 26 of the charged particles. The bunches 26 can be deflected by each deflection stage 90 as the bunch 26 propagates along the propagation axis 24. The bunches 26 can be portions of a continuous particle beam and can be temporally focused (e.g., in the longitudinal direction along the propagation axis 26) and/or spatially focused (e.g., in at least one transverse direction substantially perpendicular to the propagation axis 26). In certain implementations, the beam steering control subsystem 20 comprises a center aperture (not shown) configured to receive the charged particles and to allow at least some of the charged particles to propagate downstream within the beam steering control subsystem 20.

In certain implementations, the beam steering control subsystem 20 is configured to deflect the bunches 26 substantially perpendicularly to the propagation axis 24 (e.g., with deflection angles less than or equal to 20 degrees). The beam steering control subsystem 20 can comprise between 1 and 1,000 deflection stages 90 (e.g., 1, 2, 3, or 4 deflection stages 90) and each deflection stage 90 can comprise at least one electrode 92 (e.g., 1, 2, 3, 4, 8, or 10 electrodes 92). The electrodes 92 of a deflection stage 90 can be positioned on opposing sides of the propagation axis 24 and can be positively charged or negatively charged such that bunches 26 are deflected substantially perpendicularly to the propagation axis 24. Adjacent electrodes 92 (e.g., electrodes 92 spaced from one another longitudinally along the propagation axis 24) can be separated from one another by an electrically insulative material. In certain implementations, each deflection stage 90 comprises a quadrupole, an octupole, and/or a decapole. Other quantities of deflection stages 90 and electrodes 92 are also compatible with certain implementations described herein.

In certain implementations, a phase of the bunches 26 in a longitudinal direction along the propagation axis 24 is configured to be substantially equal, single harmonic, multiple harmonic, random, combinations thereof, and the like. The spacings between the deflection stages 90 can be configured to be synchronized and to be in phase with the bunches 26. In certain implementations, longitudinal positions of the deflection stages 90 and/or the electrodes 92 are adjustable (e.g., using piezoelectric motors). For example, the beam steering control subsystem 20 can comprise a digital feedback system configured to adjust the spacings between the deflection stages 90.

In certain implementations, an average or mean velocity of the charged particle bunches 26 is in a range of $1 \times 10^4$ meters/second (m/s) to $3 \times 10^8$ m/s. In certain implementations, the deflection stages 90 are configured to synchronize the application of electric potentials by the electrodes 92 with a mean velocity of the bunches 26 propagating through the beam steering control subsystem 20, such that each bunch deflection is synchronized with a velocity of the target 24. For example, each deflection stage 90 can be configured to apply a voltage only when a bunch 26 is propagating through the deflection stage 90. In certain implementations, the deflection stages 90 are configured to harmonically synchronize the application of electric potentials by the electrodes 92 with a mean velocity of the bunches 26 propagating through the beam steering control subsystem 20. For example, each deflection stage in at least a portion of the beam steering control subsystem 20 can be configured to apply a voltage only when a particular bunch 26 is propagating through the deflection stage 90. In certain implementations, the deflection stages 90 are configured to randomly synchronize the application of electric potentials by the electrodes 92 with a mean velocity of the bunches 26 propagating through the beam steering control subsystem 20. As used herein, the phrase "randomly synchronize" is to be given its broadest possible meaning including, but not limited to, synchronization of the application of voltages by the deflection stages 90 to bunches 26 with random spacings or synchronization of the application of voltages by random deflection stages 90 to bunches 26 with random or other spacings.

In certain implementations, the electrodes 92 of a deflection stage 90 are configured to apply a substantially equal voltage potential as each bunch 26 propagates through the deflection stage 90. The amount of deflection of each bunch 26 depends on the number of electrodes 92 activated sequentially. In certain implementations, variable potentials are applied to each deflection stage 90 as each bunch 26 propagates through the deflection stage 90. For example, the electrodes 92 of a first deflection stage 90 can have a first voltage and the electrodes 92 of subsequent deflection stages 90 (e.g., deflection stages 90 downstream from the first deflection stage 90) can have progressively higher voltages, resulting in a linear deflection as the electrodes 92 are activated. For another example, the electrodes 92 of a first deflection stage 90 can have a first voltage and the electrodes 92 of subsequent deflection stages 90 can have progressively smaller voltages. The number of deflection stages 90 activated can define the amount of deflection of each bunch 26. The signal timing and nominal voltages applied to the electrodes 92 can be calibrated for individual deflection stages 90 and even individual electrodes 92 within each deflection stage 90. Triggering an applied voltage of individual deflection stages 90 can be delayed to match the incidence of each bunch 26 ("phase-matching"), for example due to changes in charged particle velocity, charged particle species, charged particle mass, deflection stage position, pattern resolution, pattern field errors, errors within an objective deflection field, process specific compensation and write strategies, combinations thereof, and the like. In certain implementations, a field perimeter of the deflection stages 90 can be defined as the minor deflection field with a size dependent upon the distance from the most downstream deflection stage 90 to the target 5 (e.g., minor deflection field size resulting from deflections less than or equal to 20 degrees).

In certain implementations, each deflection stage 90 is configured to apply potentials to the electrodes 92 that partially displace the bunches 26 towards an expected trajectory of the moving target 5 (e.g., such that the bunches 26 impact the target 5 at a future predicted position of the target 5). For example, each bunch 26 can be partially deflected 1/Nth of an expected deflection distance by each of a number N of deflection stages 90. For another example, a first deflection stage 90, or any single deflection stage 90, can be configured to substantially fully displace one or more (e.g., all) bunches 26 towards an expected trajectory of the target 5, and the other deflection stages 90 can be used to fine tune the deflections of the bunches 26. Other variations and configurations are also compatible with certain implementations described herein.

In certain implementations, at least a portion of the beam steering control subsystem 20 comprises N sets of harmonically synchronized deflection stages 90, each set of deflection stages comprising N electrodes 92, in which every Nth deflection stage 90 is configured to displace a particular bunch 26 towards an expected trajectory of the target 5. For example, for a portion of the beam steering control subsystem 20 comprising two sets of deflection stages 90, every other deflection stage 90 in the two sets of deflection stages 90 can be configured to displace a particular bunch 26 towards an expected trajectory of the target 5. For another example, for a portion of the beam steering control subsystem 20 comprising three sets of deflection stages 90, every third deflection stage 90 in the three sets of deflection stages 90 can be configured to displace a particular bunch 26 towards an expected trajectory of the target 5. Other variations and configurations are also compatible with certain implementations described herein.

Beam Charge Control Subsystem

Figure 3:
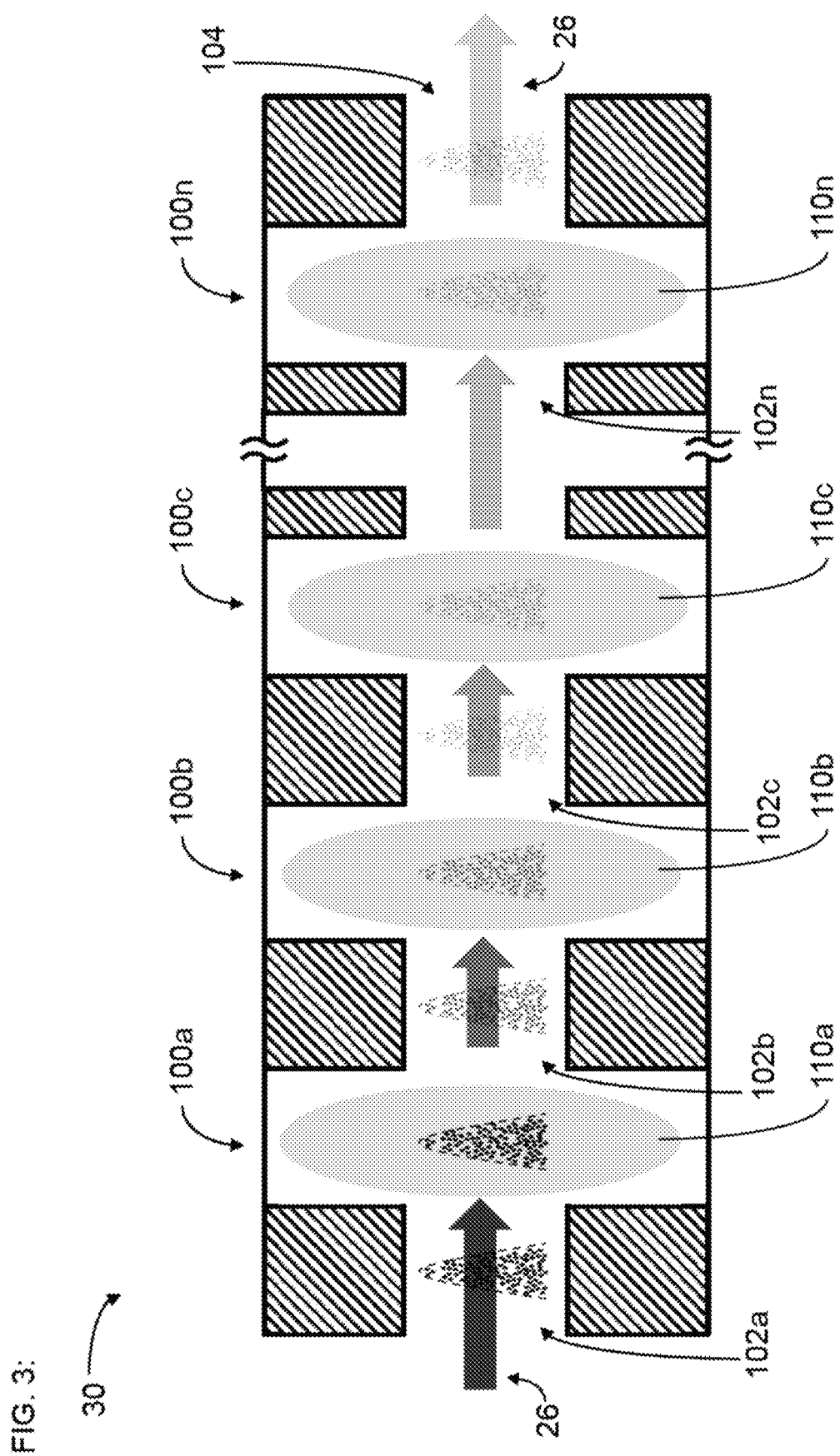
FIG. 3 schematically illustrates an example beam charge control subsystem in accordance with certain implementations described herein.

In certain implementations, the beam charge control subsystem 30 is downstream from the beam steering control subsystem 20 (e.g., downstream from the beamline 70) and is configured to reduce an electric charge of the particle beam 22 propagating to the target 5. FIG. 3 schematically illustrates an example beam charge control subsystem 30 in accordance with certain implementations described herein. The beam charge control subsystem 30 comprises a plurality of slow wave recombination chambers 100 configured to expose bunches 26 of the particle beam 22 propagating through the recombination chambers 100 to neutralizing particle beams 110 (e.g., electrons) such that the electric charge of the bunches 26 of the particle beam 22 is reduced.

As schematically illustrated by FIG. 3, an input stream of periodic pulses of ions (e.g., the bunches 26 of the particle beam 22) enters a first recombination chamber 100a of the beam charge control subsystem 30 through a first aperture 102a. During the transit time of each bunch 26 through the first recombination chamber 100a, a controlled burst of electrons 110a (e.g., up to the current density of the charged particle beam) is emitted in a direction transverse (e.g., substantially perpendicular) to the propagation axis 24 (e.g., into the page of FIG. 3). Some of the ions of the bunch 26 capture an electron of the controlled burst of electrons 110a and undergo ion-electron recombination, converting these ions into neutral particles. The partially neutralized bunch 26 can then then pass through a second aperture 102b into a second recombination chamber 100b. During the transit time of each bunch 26 through the second recombination chamber 100b, a controlled burst of electrons 110b is emitted in a direction transverse (e.g., substantially perpendicular) to the propagation axis 24 (e.g., into the page of FIG. 3), such that additional ions of the bunch 26 are converted to neutral particles. The slow wave neutralization process can be repeated through additional recombination chambers (e.g., third recombination chamber 100c, more recombination chambers 100n) until substantially every ion within each bunch 26 has been converted to a neutral particle. The beam 22 exiting through the output aperture 104 comprises a periodic stream of neutral particle bunches 26.

While certain implementations described herein perform charge neutralization of a pulsed ion beam (see, e.g., FIG. 3), in certain other implementations, the originating beam to be charge neutralized can comprise any stream of atomic or subatomic charged particles (e.g., ions, anions, positrons, electrons, fermions, bosons, hadrons, atomic nuclei, baryons, and mesons). In certain implementations, the originating beam comprises photons, which for most classical models of physics and for most purposes are considered to be chargeless. However, photons propagating in magnetized vacuum in certain energy states (e.g., such as those which can be encountered in a spacecraft-mounted directed energy weapon) have been observed to interact with the virtual electron-positron field and thus can behave as a charged particle, and can be considered to be "charged particles" for purposes of this disclosure. Furthermore, in certain implementations, the originating beam can be a continuous beam comprising a continuous stream of charged particles.

While certain implementations described herein utilize a neutralizing beam of electrons, in certain other implementations, the neutralizing beam can comprise any charged particles that are oppositely charged to the charged particles of the originating beam (e.g., photons (which can be considered to have a very minute charge), ions, protons, positrons, electrons, fermions, bosons, hadrons, atomic nuclei, baryons, and mesons). The opposite charged particles of the neutralizing beam can also comprise particles having an unlike charge of the same magnitude as the particles of the originating beam, or can comprise particles having an unlike charge of different magnitudes as the particles of the originating beam. In certain implementations, the neutralizing beam can be emitted as a controlled burst or a pulsed beam comprising periodic pulses of charged particles, or can be emitted as a continuous beam comprising a continuous stream of charged particles.

In certain implementations in which the originating beam is a pulsed beam comprising periodic pulses of charged particles, the bursts of opposite charged particles can be emitted from the neutralizing beam with the same period as the pulses of the charged particles of the originating beam, such that each pulse of charged particles of the originating beam is exposed to a corresponding pulse of opposite charge particles emitted by the neutralizing beam. In certain implementations in which the originating beam comprises periodic pulses of charged particles and transits multiple recombination chambers, the originating beam can be exposed to a neutralizing beam within each of the recombination chambers, with each of the neutralizing beams being configured to emit bursts of opposite charged particles with the same period as the pulses of the charged particles of the originating beam, but with the phases of each neutralizing beam offset from the other neutralizing beams such that each pulse of the originating beam is exposed to and receives a burst of neutralizing charged particles as the pulse of the originating beam transits the respective recombination chamber.

In certain implementations, multiple neutralizing beams can transit and intersect with the originating beam within a single recombination chamber, and the timing and/or outputs of such multiple neutralizing beams can be adjusted in order to adjust the resulting final parameters of the originating beam following transit through the one or more recombination chambers of the beam charge control subsystem 30. In certain implementations, the timing of any specific emission of a burst of opposite charged particles of the neutralizing beam can be configured to maximize an intersection with the pulses of charged particles of the originating beam transiting the recombination chamber 100 and to maximize the resulting recombination events. In certain such implementations, the timing of any specific emission of a burst of opposite charged particles of the neutralizing beam can also be configured to only result in overlap of the burst of opposite charged particles of the neutralizing beam with only portions of the pulses of charged particles of the originating beam transiting the recombination chambers, which can result in recombination occurring only within a portion of the pulse of charged particles of the originating beam. In certain implementations, only some pulses of charged particles of the originating beam are exposed to opposite charged particles of a neutralizing beam within a recombination chamber (e.g., every other pulse of the originating beam).

In certain implementations, the originating beam undergoes complete charge neutralization by the beam charge control subsystem 30 (e.g., the resulting beam has a neutral charge), while in certain other implementations, the originating beam undergoes fractional neutralization by the beam charge control subsystem 30 (e.g., the resulting beam has a positive charge or negative charge of any particular magnitude). For example, a single exposure to a burst of opposite charged particles from a single neutralizing beam within a single recombination chamber can be insufficient to fully neutralize a pulse of charged particles of the originating beam, resulting in only fractional neutralization. As such, the originating beam can transit through multiple recombination chambers, each having a corresponding neutralizing beam transiting therethrough, to accomplish total or near-total neutralization of each pulse of the originating beam via successive fractional neutralizations. This process of total or near-total neutralization (or charge modulation to any desired charge state) via successive fractional naturalizations can also be accomplished by exposing each pulse of charged particles of the neutralizing beam to successive bursts of opposite charged particles within the same recombination chamber (e.g., via multiple neutralizing beams which transit the recombination chamber, or via repeated transit of a single originating beam thorough the same recombination chamber).

In certain implementations, as schematically illustrated by FIG. 3, the neutralizing beam within the recombination chambers is configured to emit bursts of opposite charged particles in a transverse direction to the direction of transit of the charged particles of the originating beam, whereupon the charged particles of the originating beam are reduced to a lesser charge by cross-sectional proximity collisions with the opposite charged particles of the neutralizing beam. In certain other implementations, the neutralizing beam is configured to travel in line with, opposite to, adjacent to, or at any angle with respect to the direction of transit of the originating beam, which can include only partial intersections of the paths of transit of the neutralizing beam and the originating beam, all of which can result in a change in the resulting parameters of the resulting charge-modulated originating beam.

In certain implementations, the beam charge control subsystem 30 is configured to produce an output beam with a controlled energy output at a level that is not 0 eV (e.g., neutral) but is close to neutral (e.g., within 20% neutral), or an output beam that has an energy spread around a target energy (e.g., without requiring precision or which is specifically controlled to have a level of inherent imprecision or deviance from a target output charge). For example, the output beam can have an arbitrary, random, or weighted output energy within a predetermined range (e.g., within a range of 0 eV±0.1 eV), or the output beam can comprise other charge states, such as 1 eV instead of 0 eV, or combinations of these concepts. Likewise, beyond merely recombining the charge vacancy to produce a neutral output beam, certain implementations produce a predetermined orbital configuration in the output beam, in addition to or as an alternative to achieving an output beam that has a resultant charge (or lack thereof) as a sole target. In certain implementations, a predetermined beam propagation direction is a criterion of a predetermined output beam, in addition to or as an alternative to any of the above criteria.

Beam Scanning or Writing

In certain implementations, scanning the target 5 comprises exposing the target 5 to the particle beam 22 (e.g., charged particles). For example, exposing the target 5 can comprise forming a stream of charged particles, collimated and propagating the stream along a propagation axis 24, bunching (e.g., pulsing; digitizing) the charged particles to form a particle beam 22 of bunches 26 (e.g., groups; pulses) each comprising at least one charged particle, deflecting the bunches 26 using a series of electrodes (e.g., deflection stages 90) disposed longitudinally along the propagation axis 24, demagnifying the particle beam 22, and focusing the demagnified particle beam 22 onto the target 5. The dosage of exposure can be less than about $1 \times 10^{75}$ charged particles/$cm^2$ (e.g., less than about $1 \times 10^{25}$ charged particles/$cm^2$; less than about $1 \times 10^{17}$ charged particles/$cm^2$; less than about $1 \times 10^{10}$ charged particles/$cm^2$). As described herein, digitizing the particle beam 22 can comprise, for example, beam bunching, high speed blanking, combinations thereof, and the like.

In certain implementations, deflecting the bunches 26 comprises selectively applying voltages across the electrodes 92 at each deflection stage 90. Selectively applying the voltages can comprise applying a first voltage at a first deflection stage 90a and applying second voltages at subsequent second deflection stages 90b downstream from the first deflection stage 90a. For example, the second voltages can be less than the first voltage, greater than the first voltage, or substantially equal to the first voltage. Demagnification of the bunches 26 can produce packet diameters of less than about 200 millimeters (e.g., less than about 200 microns; less than 200 nanometers).

As described herein, various deflection technologies can be used to expose the target 5 to the particle beam 22 (e.g., scanning or writing). The beam steering control subsystem 20 of certain implementations achieves minor field deflection of the bunched beam 22 (e.g., deflection of an individual bunch 26 of charged particles) by utilizing the longitudinal spatial and temporal spacing of the groups of charged particles. For example, the voltage applied to each deflection stage 90 of the beam steering control subsystem 20 can be timed to match the velocity of each group of charged particles. The beam steering control subsystem 20 of certain implementations also achieves major field deflection of the bunched beam 22 (e.g., deflection of the whole particle beam 22) as well.

In certain implementations, the beam steering control subsystem 20 is configured to raster scan the particle beam 22 (e.g., a scanning mode in which the particle beam 22 moves back and forth over the entire target 5 in a serpentine motion). In certain other implementations, the beam steering control subsystem 20 is configured to vector scan the particle beam 22 (e.g., a scanning mode in which the particle beam 22 scans only selected areas of the target 5, and after scanning of the selected area is completed, the particle beam 22 is turned off and moves to the next target 5 to be scanned). Certain other implementations utilize are configured to use a hybrid vector-raster approach (e.g., utilizes a vector scan approach for major field deflection between different targets 5 and utilizing a raster scan approach for deflections of the particle beam 22 within a subfield of a target 5). Scan speed improvement can result from only moving the particle beam 22 to the positions of the targets 5 to be exposed. Another hybrid vector-raster approach compatible with certain implementations described herein includes a vector deflection in a major field, and a raster scanning of the target 5 within a minor field. The vector capability of a vector-raster system can provide high speed scanning versus a pure raster scan system, and the raster capability of the vector-raster system permits good exposure fidelity and high current with a small dwell time. In certain implementations, the beam steering control subsystem 20 is configured to modify, in real-time, at least one of a scan field size, a scan field density, and a scan dwell duration of the particle beam 22 impinging the target 5.

Figure 4:
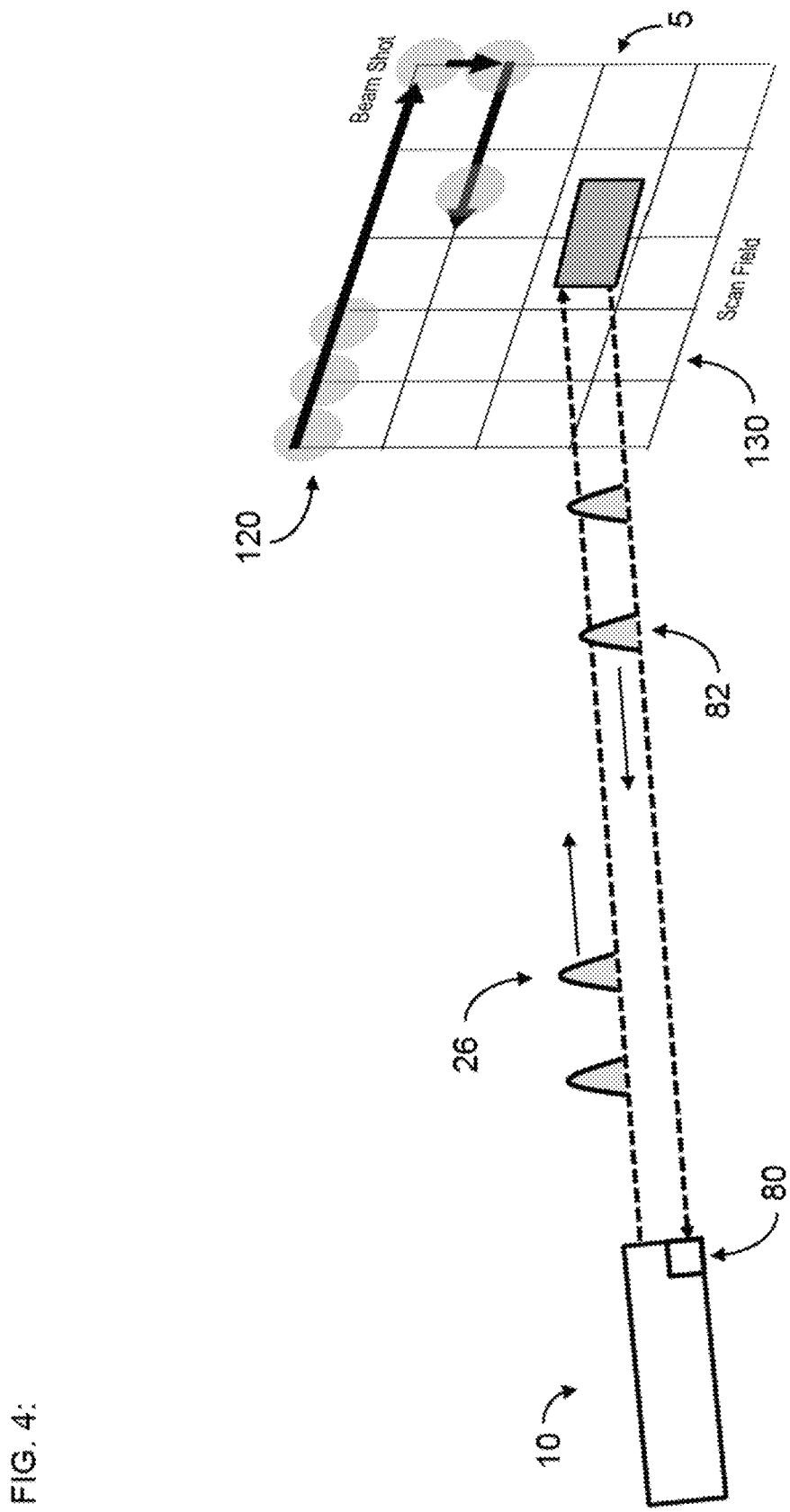
FIG. 4 schematically illustrates an example scanning method in accordance with certain implementations described herein.

FIG. 4 schematically illustrates an example scanning method in accordance with certain implementations described herein. The system 10 of FIG. 4 projects bunches 26 of the particle beam 22 to irradiate an area of the target 5 and the at least one detector 80 (e.g., optical sensor) receives optical pulses 82 emitted from the illuminated area of the target 5. In certain implementations, the at least one detector 80 is mechanically coupled to the beamline 70 (e.g., the bunches 26 and the detected optical pulses 82 propagating in substantially parallel directions to one another, as shown in FIG. 4), while in certain other implementations, the at least one detector 80 is mechanically separate from the beamline 70 (e.g., the bunches 26 and the detected optical pulses 82 propagating in substantially non-parallel directions to one another).

As shown in FIG. 4, the bunches 26 of the particle beam 22 (e.g., the illuminating beam pulses) are scanned in raster fashion across the entire area of the target 5. For example, the spot size 120 of the particle beam 22 can be greater than the pixel size 130 (e.g., grid spacing) of the raster (e.g., in a range of 100 meters to 0.1 millimeter). For another example, as shown in FIG. 4, the spot size 120 of the particle beam 22 can be substantially equal to the pixel size 130 (e.g., grid spacing) of the raster. The pattern can be vector scanned in the major field, vector scanned in the minor field, and raster scanned in a single pass within the target 5. The exposure of the target 5 with the bunched particle beam 22 can leverage the per pixel dose variation to improve feature resolution. In certain implementations, a ratio of the bunched beam spot size 120 to the pixel size 130 can be greater than one to average placement of the groups of charged particles and to improve resolution. A large ratio of the pulsed beam spot size 120 to the pixel size 130 (e.g., in a range of 0.1 to 1000) can allow co-joined pixel image processing and can allow a higher dose deposition on the target 5 due to cumulative dosing from overlapping bunches 26 for improved stimulated emission of the target 5.

In certain implementations, scanning comprises alternating row and column exposure with a large beam spot size 120 (e.g., in a range of 1 millimeter to 10 meters) and a small pixel size 130 (e.g., in a range of 100 meters to 0.01 millimeter). Exposing alternating pixels with a bunched particle beam 22 can produce a pixel exposure width half as wide as the selected feature, thereby increasing the resolution of small features within the target 5 over the object size in both axes. That is, the target 5 can be vector scanned in the major field, vector scanned in the minor field, and raster scanned in alternating pixels in both x- and y-directions with a single pass within the feature of the target 5 to be exposed. Scan speed can be increased by effectively reducing the number of charged particles per bunch 26, but at the cost of critical dimension control. In certain implementations, this scan mode for a bunched beam can provide one or more advantages, such as the ability to apply per pixel dose variation or multiple species exposure to improve stimulated emission, feature edge quality, and scan speed. The scan speed improvement can be dramatic since the system scan speed can increase as the square of the effective scan grid.

In certain implementations, scanning comprises dividing pixel spaced matrices (e.g., "composites") and overlaying the scan exposure of a combination of scan composites interleaved in a series of scan passes, with each scan pass offset from other scan passes in both the x- and y-directions by a fraction of the pixel scan address. For example, the pattern can be vector scanned in the major field, vector scanned in the minor field, and raster scanned in a series of scan passes that interleave the pixels within the target 5. The beam spot size 120 can be in a range of 25% to 100% larger than pixel size 130 to average out the bunched beam exposure to reduce the number of charged particles per group.

In certain implementations, writing comprises using a sampling matrix having an array of cells of a predetermined input address size. Each scan pass can produce a writing grid defined by the distance between beam placements in a single scan pass. For example, the pattern can be vector scanned in the major field, vector scanned in the minor field, and raster scanned in a series of passes offset in the x- and y-directions to create multiple offset composite scans that interleave the pixels within the target 5. The composite of all passes can form the effective exposure grid. The dose of the beam 22 can also be freely varied within the operating envelope of the system 10. This write mode for a bunched particle beam 22 can provide one or more advantages, such as the ability to apply per pixel dose variation to improve feature edge quality when scanning fast moving targets 5, thereby achieving a balance between feature quality and scan speed. The dose of the particle beam 22 can also be varied within the scan-defined operating envelope of the system 10, utilizing various techniques including modulating the duty cycle of the beam buncher 60. Multiple levels of pixel intensity can be provided in a range of 0% to 100% beam intensity. Pixels of high intensity can be used along an edge of a target 5 so as to define the edge at higher resolution.

Detector

In certain implementations, the system 10 further comprises at least one detector 80 (e.g., illumination sensor) configured to detect photon emission (e.g., stimulated emission) from the target 5 resulting from impinging at least a portion of the particle beam 22 onto at least a portion of the target 5. Examples of detectors 80 compatible with certain implementations described herein, include but are not limited to: optical diodes with enhanced photovoltaic energy conversion; vacuum photodiode detectors; avalanche diode detectors. The at least one detector 80 can have an operational bandwidth that includes a portion of the x-ray electromagnetic spectrum, the ultraviolet electromagnetic spectrum, the visible electromagnetic spectrum, and/or the infrared electromagnetic spectrum. In certain implementations, the at least one detector 80 comprises at least one integrated filter configured to block and/or remove ambient background optical signals from the operational environment.

For example, as shown in FIG. 4, the at least one detector 80 can be configured to receive optical signals 82 (e.g., light pulses) generated by the stimulated emission. In certain implementations, the at least one detector 80 does not comprise a focal plane detector because the system 10 projects a time and spatial coded pixel scan of the irradiated portion of the target 5 seeking an emission response return from each time gated pulse pixel. The deflected beam pixel, combined with the temporal detected emission response provides an image of the irradiated portion of the target 5. The temporal response of the at least one detector 80 along with the projected beam location and pulse phase can provide the spatial resolution (in the X, Y, and Z directions) of the irradiated portion of the target 5. The at least one detector 80 can be configured to provide a very high sensitivity within a predetermined spectral region and very fast response time.

In certain implementations, the at least one detector 80 is configured to measure a distance between the at least one detector 80 and the target 5. For example, as shown in FIG. 4, the particle beam bunches 26 (e.g., pulse signal) can impinge the target 5 causing illumination by stimulated emission, and the resulting optical signals 82 can be then detected by the at least one detector 80. The at least one detector 80 can measure the temporal phase of the particle beam 22 (e.g., the pulse chain) and any controlled interruptions in the particle beam 22 with the detected stimulated emission of the return pulse signal 82, and a time delay related to the distance can be obtained for each pixel exposed on the target 5. The time differential can be used as a gated return signal. By controlling the interruptions (e.g., using particle beam blanking), a code can be imparted into the stimulated emission illumination and identified by the detector response. This code can be used as a further enhancement to identify the return as a carrier signal of the intended target illumination for enhanced return signal.

Figure 5:
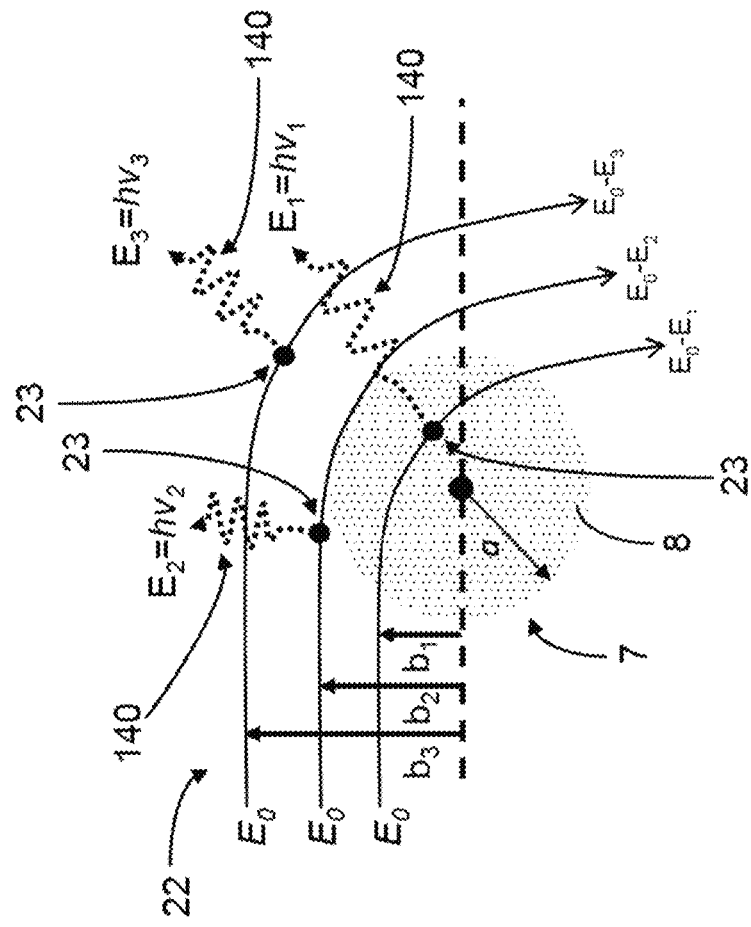
FIG. 5 schematically illustrates photon emission resulting from interaction between surface atoms of the target and a particle beam comprising charged particles impinging the target in accordance with certain implementations described herein

FIG. 5 schematically illustrates photon emission resulting from interaction between surface atoms 7 of the target 5 and a particle beam 22 comprising charged particles 23 impinging the target 5 in accordance with certain implementations described herein. As shown in FIG. 5, the atoms 7 have a potential field 8 (e.g., with a radius a) and the particles 23 (e.g., charged particles; neutral particles) of the particle beam 22 have a kinetic energy $E_0$ with various distances b (e.g., impact parameters) between the particle 23 and a center of the potential field 8 (e.g., between the particle 23 and the nucleus of the atom 7) in a direction perpendicular to the incident trajectory of the particle 23. Stimulated emission from kinetic and electronic excited surface atoms 7 of the target 5 can be achieved by exposing the target 5 with the particle beam 22 to induce excitation and ionization radiation of the surface atoms 7. Energy absorption of at least one of the kinetic energy and the electronic energy of the incident particle beam 22 can excite the atomic orbital electrons of the surface atoms 7. The electrons then decay into a lower state by the process of spontaneous emission, releasing energy as a photon 140. The incident particle beam 22 can create a net population inversion of the electronics optical amplification of the incident energy. By controlling the incident kinetic and charge metrics of the incident particle beam 22, the spontaneous emission optical amplification amplitude, frequency, phase and polarization can be optimized for enhanced detection. See, e.g., F. W. Saris et al., "Cross Sections for Ar L-Shell and Ne K-Shell X-Ray Emission in Heavy Ion-Atom Collisions," Physica Vol. 49, pp. 441-460 (1970); A. R. Knudson et al., "Aluminum X-Ray Satellite Enhancement by Ion-Impact Excitation," Phys. Rev. Lett. Vol. 26, No. 19, pp. 1149-1152 (1971); N. H. Tolk et al., "Photon emission from low-energy ion and neutral bombardment of solids," Rad. Effects Vol. 18, No. 3-4, pp. 221-229 (1973); W. Hink, "X-ray production by ion bombardment," Revue de Physique Appliquée, Société française de physique, EDP, Vol. 11, No. 1, pp. 31-45 (1976); J. A. Tanis et al., "Projectile Fluorescence Yields in Heavy Ion Collisions," Phys. Lett. Vol 67A, No. 2, pp. 124-126 (1978); A. Morozov et al., "Conversion efficiencies of electron beam energy to vacuum ultraviolet light for Ne, Ar, Kr, and Xe excited with continuous electron beams," J. Appl. Phys. Vol. 103, p. 103301 (2008); I. Gorlachev et al., "K-, L-, and M-shell x-ray productions induced by xenon ions," Nucl. Inst. and Meth. Phys. Res. B 430, pp. 31-35 (2018); D. Pinheiro et al., "K- and L-shell theoretical fluorescence yields for the Fe isonuclear sequence," Rad. Phys. and Chem. Vol. 203 p. 110594 (2023).

Although commonly used terms are used to describe the systems and methods of certain implementations for case of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z." unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about." "generally," and "substantially." represent a value, amount, or characteristic close to the stated value, amount, or characteristic that still performs a desired function or achieves a desired result. For example, the terms "approximately." "about." "generally." and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than." less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. In addition, although the disclosed methods and apparatuses have largely been described in the context of various devices, various implementations described herein can be incorporated in a variety of other suitable devices, methods, and contexts.

Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. A particle beam illuminating system comprising:
   a beam steering control subsystem configured to receive charged particles and to generate and scan a particle beam over at least a portion of a target located a distance of at least 10 meters from the beam steering control subsystem; and
   a beam charge control subsystem configured to receive the particle beam from the beam steering control subsystem and to control an output charge of the particle beam impinging the target.

2. The system of claim 1, further comprising a charged particle source configured to provide charged particles in a plurality of particle species, a particle filter configured to receive the charged particles in the plurality of particle species and to controllably select charged particles of an individual particle species, a beam buncher configured to receive the selected charged particles and to generate a segmented beam pulse train and to provide the beam pulse train to the beam steering control subsystem.

3. The system of claim 2, wherein the charged particle source is selected from the group consisting of: a confined ion source; a liquid metal ion source (LMIS); plasma ion source (PIS); a volume plasma ion source (VPIS); a gas field ionization source (GFIS); a carbon nanotube field emitter; a free electron laser and a substrate irradiated by the free electron laser; a pulsed laser ablation ion source; a magnetically confined plasma anode (MAP) source; a thermal field emission (TFE) electron source.

4. The system of claim 3, wherein the charged particle source is configured to generate a time evolving modulated amplitude output.

5. The system of claim 1, further comprising a beam buncher configured to generate a segmented beam pulse train comprising a plurality of bunches.

6. The system of claim 5, wherein the beam buncher is configured to control a charged particle density of the bunches.

7. The system of claim 1, further comprising at least one detector configured to receive and detect photon emission generated by interactions of the particle beam with the target.

8. The system of claim 1, wherein the particles are selected from the group consisting of: photons; ions; anions; protons; electrons.

9. The system of claim 1, further comprising an accelerating potential configured to accelerate the particle beam, the accelerating potential in a range of 5 keV to 5 GeV.

10. The system of claim 9, wherein the accelerating potential is in a range of 0.1 MeV to 10 MeV.

11. The system of claim 1, wherein the beam steering control subsystem comprises a plurality of deflection stages configured to scan the particle beam across a surface area of the target.

12. The system of claim 11, wherein the beam steering control subsystem is configured to modify, in real-time, at least one of a scan field size, a scan field density, and a scan dwell duration of the particle beam impinging the target.

13. The system of claim 1, wherein the particle beam impinging the target has a current density above 0.1 ampere per centimeter squared.

14. A system comprising:
   a charged particle beamline configured to project, focus, and control a particle beam;
   a beam steering control subsystem configured to direct and scan the particle beam to impinge a target at a distance greater than 10 meters from the charged particle beamline;
   a beam charge control subsystem configured to control an output charge of the particle beam; and
   at least one illumination sensor configured to receive an illuminated optical signal generated by the particle beam impinging the target.

15. The system of claim 14, wherein the at least one illumination sensor is separate from the beamline.

16. The system of claim 14, wherein the at least one illumination sensor has an operational bandwidth that includes a portion of an x-ray electromagnetic spectrum or a portion of a visible electromagnetic spectrum.

17. The system of claim 14, wherein the at least one illumination sensor comprises at least one integrated filter configured to block and/or remove ambient background optical signals from an operational environment.

18. The system of claim 14, wherein the at least one illumination sensor comprises one or more detectors configured to detect stimulated emission in different spectral bands.

19. The system of claim 18, wherein the different spectral bands are selected from the group consisting of: an x-ray spectral portion, an ultraviolet spectral portion, a visible spectral portion, and an infrared spectral portion.

20. The system of claim 18, wherein the one or more detectors comprises an optical diode.

21. The system of claim 14, wherein the at least one illumination sensor comprises at least one narrowband color filter for measuring stimulated emission at different wavelengths.

22. The system of claim 1, wherein the particle beam comprises discrete bunches of multiple particle species.

23. The system of claim 1, wherein the particle beam is configured to generate photon emission from surface atoms of the target.

24. The system of claim 23, wherein the photon emission comprises stimulated emission.

25. The system of claim 24, wherein the stimulated emission results from at least one of: excitation and ionization radiation of the surface atoms induced by the particle beam, excitation of atomic orbital electrons of the surface atoms and subsequent spontaneous emission.

26. The system of claim 24, wherein the particle beam has incident kinetic and charge metrics that optimize the spontaneous emission for enhanced detection.

27. The system of claim 23, wherein the photon emission comprises characteristic x-rays from the surface atoms.

28. The system of claim 1, further comprising a charged particle deflector configured to steer the charged particles of the particle beam, the charged particle deflector temporally synchronized with antinodes of a spatial distribution of the charged particle beam.

29. The system of claim 1, wherein the beam steering control subsystem is configured to scan the particle beam onto the target using controlled interruptions to impart a code in a stimulated emission signal from the target.

30. The system of claim 29, wherein the code is configured to be used as a further enhancement as a carrier signal of an intended target illumination for enhanced return signal.

31. The system of claim 1, wherein the target is stationary relative to the system during exposure of the target by the particle beam.

32. The system of claim 1, wherein the target is in motion relative to the system during exposure of the target by the particle beam.

33. The system of claim 1, further comprising a mass filter configured to control a species of the particle beam.

34. The system of claim 33, wherein the mass filter comprises an ExB mass filter.

35. A system comprising:
a charged particle beamline configured to project, focus, and control a particle beam; and
a beam steering control subsystem configured to direct and scan the particle beam to impinge a target at a distance greater than 1 meter from the charged particle beamline.

36. The system of claim 35, wherein the beam steering control subsystem is configured to raster scan the particle beam.

37. The system of claim 35, wherein the beam steering control subsystem is configured to vector scan the particle beam.

38. The system of claim 35, wherein the beam steering control subsystem is configured to modify, in real-time, a scan field size of the particle beam on the target.

39. The system of claim 38, wherein the beam steering control subsystem is configured to vector scan the particle beam in a major field and to raster scan the particle beam within a subfield of the target.

40. The system of claim 38, wherein the beam steering control subsystem is configured to vector scan the particle beam in a major field and to raster scan the particle beam in a minor field.

41. The system of claim 38, wherein the beam steering control subsystem is configured to vector scan the particle beam in a major field, to vector scan the particle beam in a minor field, and to raster scan the particle beam in a single pass.

42. The system of claim 38, wherein the beam steering control subsystem is configured to vector scan the particle beam in a major field, to vector scan the particle beam in a minor field, and to raster scan the particle beam in alternating pixels.

43. The system of claim 35, wherein the beam steering control subsystem is configured to scan the particle beam in a serpentine motion.

44. The system of claim 35, wherein the beam steering control subsystem is configured to control individual beam pulses to each pixel in a scan field.

45. The system of claim 35, wherein the beam steering control subsystem is configured to control groups of individual beam pulses to each pixel in a scan field.

46. The system of claim 35, wherein a ratio of a particle beam spot size to a pixel spacing size at the target is greater than one.

47. The system of claim 35, wherein a ratio of a particle beam spot size to a pixel spacing size at the target is equal to one.

48. The system of claim 35, wherein a ratio of a particle beam spot size to a pixel spacing size at the target is in a range of 0.1 to 1000.

49. The system of claim 35, wherein the beam steering control subsystem is configured to vary a ratio of a particle beam spot size to a pixel spacing size at the target to alter a particle beam flux density at the target.

50. A system comprising:
a charged particle beamline configured to project, focus, and control a particle beam; and
a beam detector subsystem configured to detect a signal of the particle beam hitting a target object at a distance greater than 1 meter from the charged particle beamline.

51. The system of claim 50, wherein the beam detector subsystem is configured to receive reflected light from the target object.

52. The system of claim 50, wherein the beam detector subsystem is configured to detect stimulated emission photons from the target object.

53. The system of claim 50, wherein the beam detector subsystem is configured to detect photons in the x-ray spectrum from the target object.

54. The system of claim 50, wherein the beam detector subsystem is configured to detect photons in the ultraviolet spectrum from the target object.

55. The system of claim 50, wherein the beam detector subsystem is configured to detect photons in the visible spectrum from the target object.

56. The system of claim 50, wherein the beam detector subsystem is configured to detect photons in the infrared spectrum from the target object.

57. The system of claim 50, wherein the beam detector subsystem is configured to measure an emission response return from the target object due to time gated pulses of the particle beam.

58. The system of claim 50, wherein the beam detector subsystem is configured to measure a pulse return time of the particle beam pulse time of flight to the target object and received photon time of flight.

59. The system of claim 50, wherein the beam detector subsystem is configured to measure a return time of a group of pulses of the particle beam illuminating the target object and received photon time of flight.

60. The system of claim 50, wherein the beam detector subsystem is configured to measure a temporal phase of the particle beam pulse chain imaged off the target object.

61. The system of claim 50, wherein the beam detector subsystem is configured to measure gated return signal along with coded interruptions imparted by the particle beam to enhance a return signal.

62. The system of claim 50, wherein the particle beam is emitted as a sequenced pulsed code at the target object.

63. The system of claim 62, wherein the beam detector subsystem is configured to receive a return signal and to identify the pulsed code from the target object.

64. A system comprising:
 a charged particle source configured to provide charged particles;
 a charged particle beamline configured to receive the charged particles from the charged particle source and to project, focus, and control a particle beam; and
 a beam steering control subsystem configured to direct and scan the particle beam to impinge a target at a distance greater than 10 meters from the charged particle beamline.

65. The system of claim 64, wherein the charged particle source is selected from the group consisting of: a confined ion source; a liquid metal ion source (LMIS); plasma ion source (PIS); a volume plasma ion source (VPIS); a gas field ionization source (GFIS); a carbon nanotube field emitter; a free electron laser and a substrate irradiated by the free electron laser; a pulsed laser ablation ion source; a magnetically confined plasma anode (MAP) source; a thermal field emission (TFE) electron source.

66. The system of claim 64, wherein the beamline comprises two or more lenses.

67. The system of claim 64, wherein the beamline comprises a reflective optic.

68. The system of claim 64, wherein the beamline comprises an aperture configured to shape the particle beam.

69. The system of claim 64, wherein the beamline is configured to accelerate the particle beam at accelerating potentials in a range of 5 keV to 5 GeV.

70. The system of claim 64, wherein the beamline is configured to use additive voltages.

71. The system of claim 64, wherein the beamline comprises an objective lens assembly.

72. The system of claim 64, wherein the beamline comprises a reflective optic objective lens.

73. The system of claim 64, wherein the beamline comprises a refractive optic objective lens.

74. The system of claim 64, wherein the beamline comprises a combination reflective optic and refractive optic objective lens.

75. The system of claim 64, wherein the beamline comprises an electrostatic afocal optical system of lenses.

76. The system of claim 64, wherein the beamline comprises an electrostatic zoom configuration of an optical system of lenses.

77. The system of claim 64, further comprising a beam charge control subsystem configured to receive the particle beam from the beam steering control subsystem and to control an output charge of the particle beam impinging the target, the beamline comprising an objective lens assembly between the charged particle source and the beam charge control subsystem.

78. The system of claim 77, wherein the objective lens assembly is configured to demagnify, focus, and/or deflect groups of charged particles of the particle beam.

79. The system of claim 64, wherein the beamline comprises beam deflection electrodes.

80. The system of claim 64, wherein the beamline comprises a combination deflection electrode and refractive lens.

81. The system of claim 64, wherein the beam steering control subsystem comprises at least one beam deflector.

82. The system of claim 81, wherein the at least one beam deflector comprises at least one electrostatic beam deflector.

83. The system of claim 82, wherein the at least one beam deflector comprises a series of electrostatic beam deflectors.

84. The system of claim 81, wherein the at least one beam deflector comprises a number of deflection stages, the number in a range of 1 to 1000.

85. The system of claim 81, wherein the at least one beam deflector comprises at least one, two, three, or four deflection stages.

86. The system of claim 81, wherein the at least one beam deflector is spatially synchronized with bunches of the particle beam.

87. The system of claim 81, wherein the at least one beam deflector is harmonically synchronized with bunches of the particle beam.

88. The system of claim 81, wherein the at least one beam deflector comprises a quadrupole.

89. The system of claim 81, wherein the at least one beam deflector comprises an octopole.

90. The system of claim 81, wherein the at least one beam deflector comprises a decapole.

\* \* \* \* \*